(12) United States Patent
Mukae

(10) Patent No.: US 12,522,379 B2
(45) Date of Patent: Jan. 13, 2026

(54) SPACE TRAFFIC MANAGEMENT SYSTEM, DEBRIS REMOVAL METHOD, MEGA-CONSTELLATION BUSINESS DEVICE, AND OADR

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 389 days.

(21) Appl. No.: 17/918,118

(22) PCT Filed: May 7, 2021

(86) PCT No.: PCT/JP2021/017583
§ 371 (c)(1),
(2) Date: Oct. 11, 2022

(87) PCT Pub. No.: WO2021/230169
PCT Pub. Date: Nov. 18, 2021

(65) Prior Publication Data
US 2023/0339627 A1    Oct. 26, 2023

(30) Foreign Application Priority Data
May 12, 2020    (JP) .................. 2020-084114

(51) Int. Cl.
*B64G 1/24*    (2006.01)
*B64G 1/10*    (2006.01)
*B64G 1/56*    (2006.01)

(52) U.S. Cl.
CPC ........... *B64G 1/242* (2013.01); *B64G 1/1085* (2013.01); *B64G 1/56* (2013.01)

(58) Field of Classification Search
None
See application file for complete search history.

(56) References Cited

U.S. PATENT DOCUMENTS 9,714,101 B1 * 7/2017 Kaplan ................ B64G 1/10
2018/0370658 A1   12/2018 Amimoto et al.

FOREIGN PATENT DOCUMENTS

JP         2017-114159 A       6/2017

OTHER PUBLICATIONS

International Search Report and Written Opinion mailed on Jul. 20, 2021, received for PCT Application PCT/JP2021/017583, filed on May 7, 2021, 8 pages including English Translation.

* cited by examiner

*Primary Examiner* — James M Mcpherson
*Assistant Examiner* — Bakari Underwood
(74) *Attorney, Agent, or Firm* — XSENSUS LLP

(57) ABSTRACT

In a space traffic management system (500), space traffic management devices (100) individually mounted in a plurality of mega-constellation business devices and in a debris removal business device (45) are connected to each other via a communication line (200). The debris removal device (45) performs Active Debris Removal (ADR) against debris formed by a satellite managed by a first mega-constellation business operator. The debris removal device (45) acquires real-time high-accuracy orbital information of a satellite group of a second mega-constellation business operator in a timeframe in which a debris removal satellite, during orbital descent, passes through an orbital altitude region where the satellite group of the second mega-constellation flies, the debris removal satellite passing through the satellite group while ensuring flight safety.

12 Claims, 25 Drawing Sheets

Fig. 11

51: ORBIT PREDICTION INFORMATION

| | 512: PREDICTED EPOCH | 513: PREDICTED ORBITAL ELEMENTS | | | | | | 514: PREDICTED ERRORS | | |
|---|---|---|---|---|---|---|---|---|---|---|
| 511: SPACE OBJECT ID | Epoch | Keplerian 6 Orbital Elements | | | | | | Predicted Error | | |
| | | Mean Motion | Eccentricity | Inclination | Right Ascension of Ascending Node RAAN | Argument of Perigee | Mean Anomaly | Traveling Direction | Orthogonal Direction | Basis |
| Satellite ID / Debris ID | Year and Day | Orbiting per Day | No Unit | deg | deg | deg | deg | km | km | |
| A | a1 | a2 | a3 | a4 | a5 | a6 | a7 | a8 | a9 | On-Orbit Measurement Value |
| B | b1 | b2 | b3 | b4 | b5 | b6 | b7 | b8 | b9 | On-Orbit Measurement Value |
| C | c1 | c2 | c3 | c4 | c5 | c6 | c7 | c8 | c9 | Analysis Value |
| D | d1 | d2 | d3 | d4 | d5 | d6 | d7 | d8 | d9 | Terrestrial Measurement Value |
| E | e1 | e2 | e3 | e4 | e5 | e6 | e7 | e8 | e9 | Terrestrial Measurement Value |
| F | f1 | f2 | f3 | f4 | f5 | f6 | f7 | f8 | f9 | SSA Measurement Value |
| Α | α1 | α2 | α3 | α4 | α5 | α6 | α7 | α8 | α9 | SSA Measurement Value |
| Β | β1 | β2 | β3 | β4 | β5 | β6 | β7 | β8 | β9 | SSA Measurement Value |
| Γ | γ1 | γ2 | γ3 | γ4 | γ5 | γ6 | γ7 | γ8 | γ9 | SSA Measurement Value |
| Δ | δ1 | δ2 | δ3 | δ4 | δ5 | δ6 | δ7 | δ8 | δ9 | SSA Measurement Value |

52: SATELLITE ORBIT PREDICTION INFORMATION (rows A–F)

53: DEBRIS ORBIT PREDICTION INFORMATION (rows Α–Δ)

SPACE TRAFFIC MANAGEMENT SYSTEM, DEBRIS REMOVAL METHOD, MEGA-CONSTELLATION BUSINESS DEVICE, AND OADR

CROSS-REFERENCE TO RELATED APPLICATIONS

The present application is based on PCT filing PCT/JP2021/017583, filed May 7, 2021, which claims priority to JP 2020-084114, filed May 12, 2020, the entire contents of each are incorporated herein by reference.

TECHNICAL FIELD

The present disclosure relates to a space traffic management system, a debris removal method, a debris removal business device, a first mega-constellation business device, a second mega-constellation business device, and an OADR.

BACKGROUND ART

In recent years, construction of a large-scale satellite constellation consisting of several hundred to several thousand satellites, or a so-called mega-constellation, has started, and a risk of satellite collision on an orbit is increasing. In addition, space debris such as satellites that have become uncontrollable due to failure, and rocket wreckage, are increasing.

With this rapid increase of space objects such as satellites and space debris in outer space, there is an increasing need in space traffic management (STM) to create international rules for avoiding collisions of space objects.

Patent Literature 1 discloses a technique of forming a satellite constellation consisting of a plurality of satellites on the same circular orbit.

Conventionally, a framework exists with which the U.S. Combined Space Operations Center (CSpOC) continuously monitors space objects and issues an alarm when approach of space objects to each other or collision of space objects against each other is anticipated. In response to this alarm, manned space stations and commercial communication satellites carry out avoidance operation when it is determined to be necessary. However, in recent years, projects have been announced in the United States to transfer the framework of issuing alarms to private satellites, to a private business operator, and a new framework has been in need.

CITATION LIST

Patent Literature

Patent Literature 1: JP 2017-114159 A

SUMMARY OF INVENTION

Technical Problem

A framework is not available that allows mega-constellation business operators to avoid collisions with each other so that flight safety is ensured at an unsteady operation stage such as orbit insertion and orbital disposal. Thus, collision avoidance operations might be insufficient in the future.

Patent Literature 1 does not describe a framework that allows mega-constellation business operators to avoid collisions with each other so that flight safety is ensured.

The present disclosure has as its objective to acquire, with a debris removal business device, real-time high-accuracy orbital information of a mega-constellation satellite group through which debris passes so that passage through the satellite group is enabled while flight safety is ensured.

Solution to Problem

In a space traffic management system according to the present disclosure in which space traffic management devices individually mounted in a plurality of mega-constellation business devices and in a debris removal business device are connected to each other via a communication line, the plurality of mega-constellation business devices managing mega-constellations which are satellite constellations each consisting of 100 or more satellites, the debris removal business device removing debris in outer space, the space traffic management devices each comprising a database and a server, the debris removal business device
performs ADR (Active Debris Removal) against debris formed by a satellite managed by a first mega-constellation business operator, and acquires real-time high-accuracy orbital information of a satellite group of a second mega-constellation business operator in a timeframe in which a debris removal satellite, during orbital descent, passes through an orbital altitude region where the satellite group of the second mega-constellation flies, the debris removal satellite passing through the satellite group while ensuring flight safety.

Advantageous Effects of Invention

With a space traffic management system according to the present disclosure, a debris removal business device can acquire real-time high-accuracy orbital information of a mega-constellation satellite group through which debris passes so that passage through the satellite group is enabled while flight safety is ensured.

BRIEF DESCRIPTION OF DRAWINGS

FIG. 11 presents an example of orbital prediction information provided to a space information recorder according to Embodiment 1.

DESCRIPTION OF EMBODIMENTS

Figure 1:
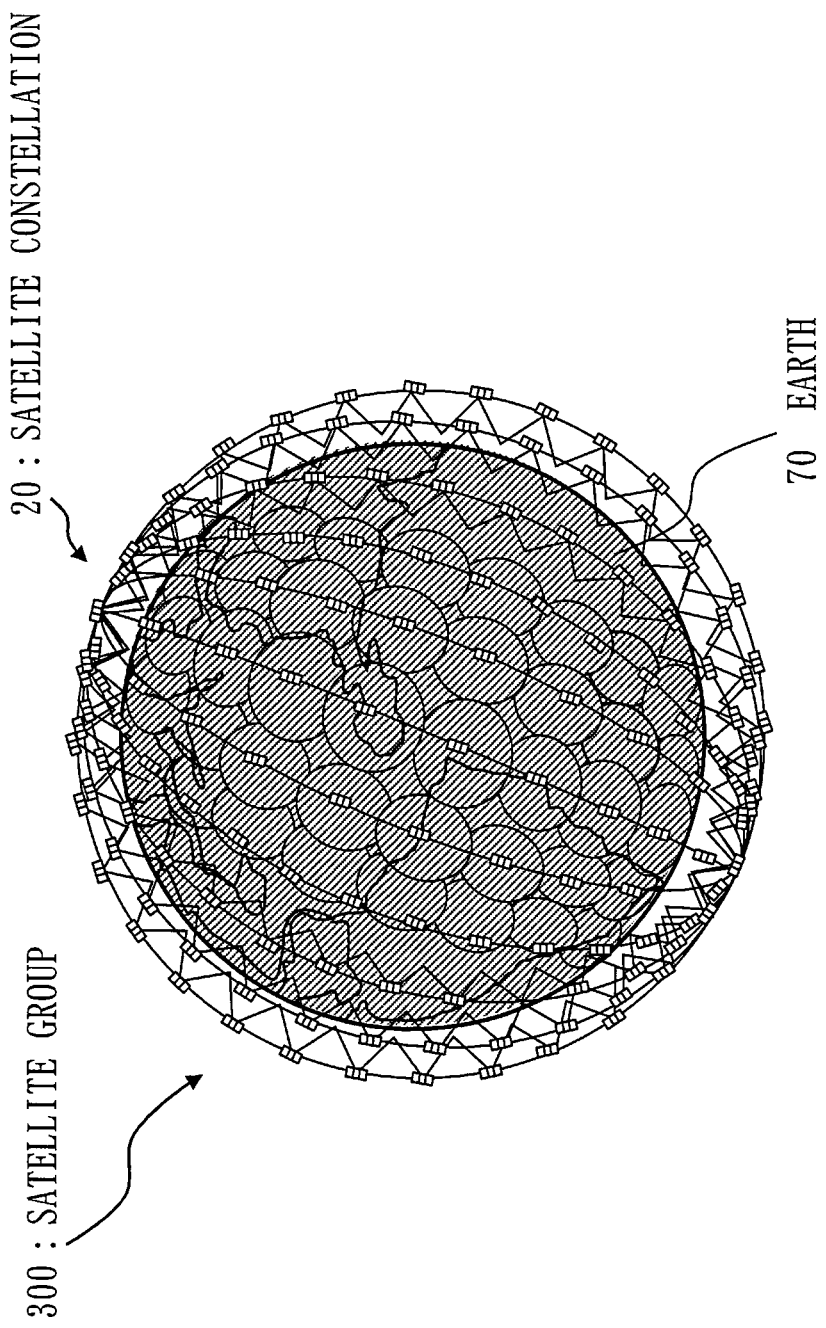
FIG. 1 presents an example in which a plurality of satellites cooperate with each other to realize a global communication service around the entire Earth.

Embodiments of the present disclosure will now be described below with referring to drawings. In the drawings, the same or equivalent portion is denoted by the same reference sign. In description of the embodiments, where appropriate, the same or equivalent portion will not be described, or will be described only briefly. Further, in the drawings below, a relationship in size among configurations may differ from what it actually is. Further, in description of the embodiments, sometimes a direction or position such as "upper", "lower", "left", "right", "forward", "backward", "front", and "rear" is indicated. These notations are merely given for descriptive convenience and do not limit a layout and orientation of a configuration such as a device, an appliance, and a component.

Embodiment 1

An example of a satellite constellation which is a prerequisite for a space traffic management system according to the embodiment below will be described.

FIG. 1 is a diagram illustrating an example in which a plurality of satellites cooperate with each other to realize a global communication service around an entire Earth 70.

FIG. 1 illustrates a satellite constellation 20 that realizes the communication service around the entire Earth.

Regarding a plurality of satellites flying on the same orbital plane and at the same altitude, a ground communication service range of each satellite overlaps with a communication service range of a following satellite. Hence, with the plurality of such satellites, the plurality of satellites on the same orbital plane can provide a communication service for a particular point on the ground alternately in a time-division manner. If an adjacent orbital plane is formed, the communication service can exhaustively cover the surface of the ground between adjacent orbits. Likewise, if a large number of orbital planes are arranged almost evenly around the Earth, it is possible to provide a global communication service for the ground around the entire Earth.

Figure 2:
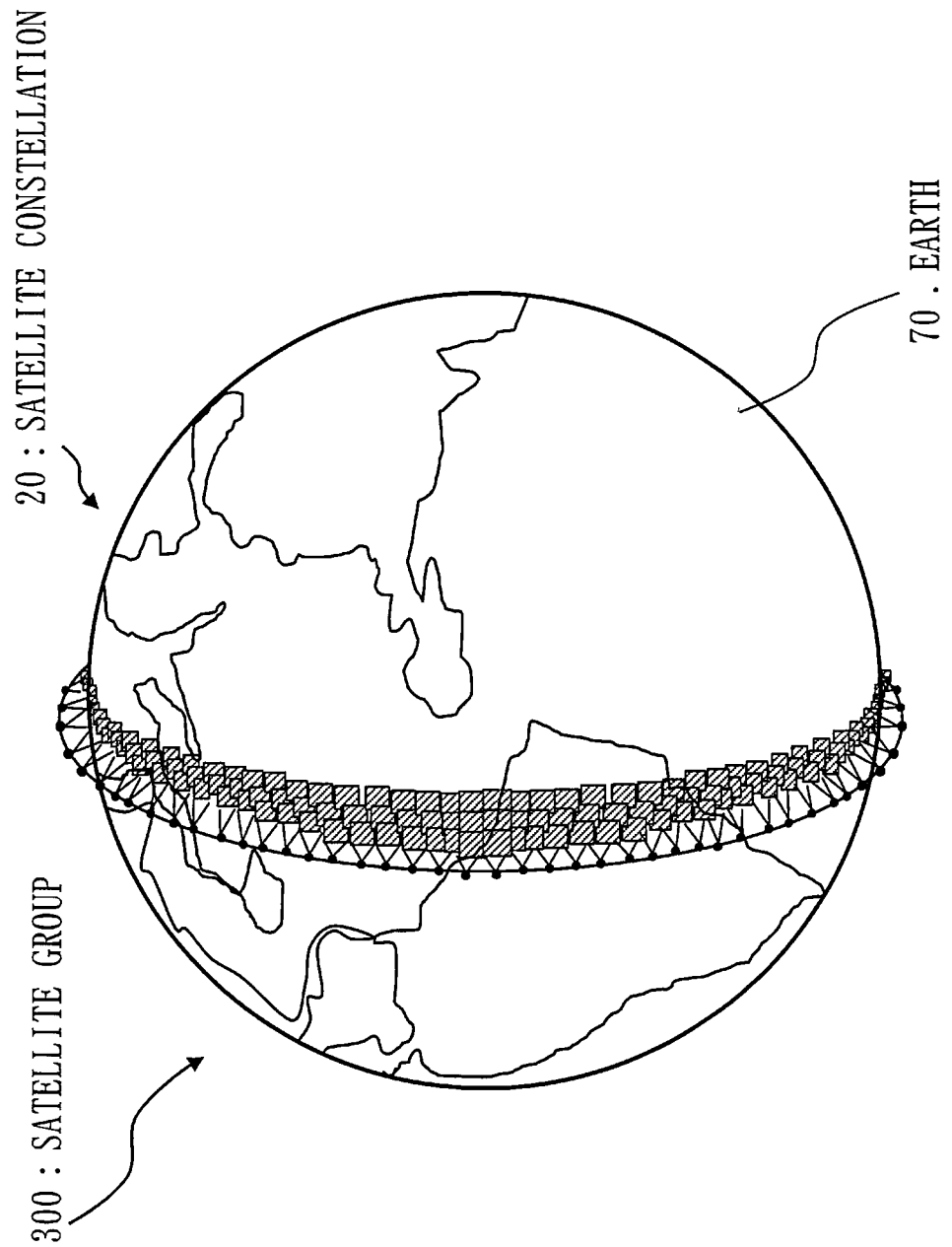
FIG. 2 presents an example in which a plurality of satellites having the same single orbital plane realize an Earth observation service.

FIG. 2 is a diagram illustrating an example in which a plurality of satellites having the same single orbital plane realize an Earth observation service.

FIG. 2 illustrates a satellite constellation 20 that realizes the Earth observation service. In the satellite constellation 20 of FIG. 2, satellites each equipped with an Earth observation device, which is an optical sensor or a radio wave sensor such as a synthetic aperture radar, fly on the same orbital plane and at the same altitude. In this manner, with a satellite group 300 in which a ground imaging range of a following satellite overlaps a preceding ground imaging range with a time delay, the plurality of satellites on the orbit sense a ground image of a particular point on the ground alternately in a time-division manner, thereby providing the Earth observation service.

In this manner, the satellite constellation 20 is constituted of the satellite group 300 formed of the plurality of satellites having individual orbital planes. In the satellite constellation 20, the service is provided by cooperation of the satellite group 300. The satellite constellation 20 specifically refers to a satellite constellation formed of one satellite group run by a communication business service company as illustrated in FIG. 1, or by an observation business service company as illustrated in FIG. 2.

Figure 3:
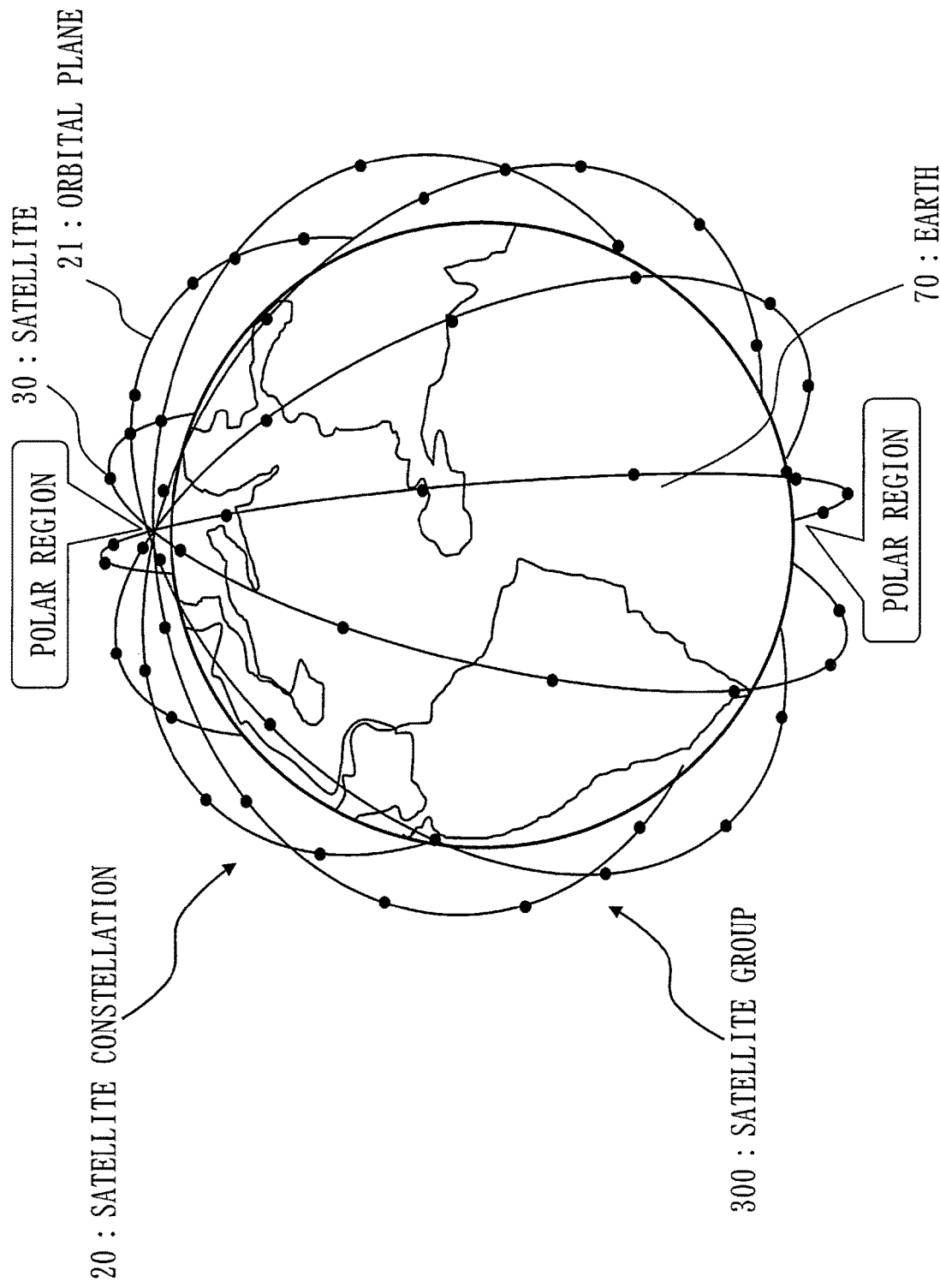
FIG. 3 presents an example of a satellite constellation having a plurality of orbital planes intersecting in vicinities of polar regions.
Figure 4:
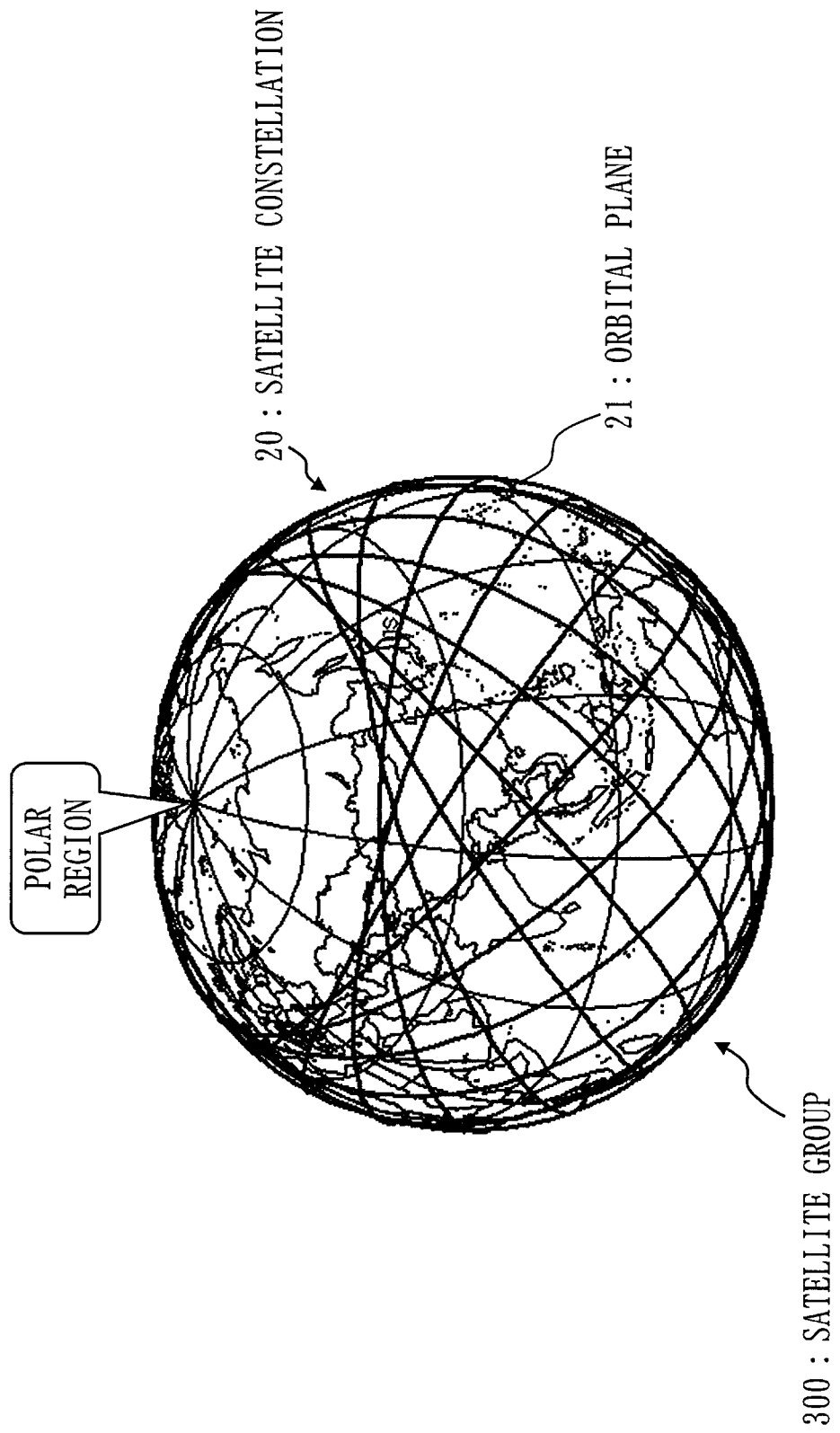
FIG. 4 presents an example of a satellite constellation having a plurality of orbital planes intersecting outside of the polar regions.

FIG. 3 presents an example of a satellite constellation 20 having a plurality of orbital planes 21 intersecting in vicinities of polar regions. FIG. 4 presents an example of a satellite constellation 20 having a plurality of orbital planes 21 intersecting outside of the polar regions.

In the satellite constellation 20 of FIG. 3, orbital inclinations of the individual orbital planes 21 of the plurality of orbital planes are approximately 90 degrees, and the individual orbital planes 21 of the plurality of orbital planes exist on different planes. In the satellite constellation 20 of FIG. 4, orbital inclinations of orbital planes 21 of the plurality of orbital planes are not approximately 90 degrees, and the individual orbital planes 21 of the plurality of orbital planes exist on different planes.

In the satellite constellation 20 of FIG. 3, two arbitrary orbital planes intersect at points in the vicinities of polar regions. In the satellite constellation 20 of FIG. 4, two arbitrary orbital planes intersect at points outside of the polar regions. In FIG. 3, there is a possibility that collision of satellites 30 occurs in the vicinities of the polar regions. As illustrated in FIG. 4, intersections of the plurality of orbital planes having orbital inclinations of more than 90 degrees separate from the polar regions according to the orbital inclinations. Also, depending on a combination of the orbital planes, there is a possibility that the orbital planes intersect at various positions including a vicinity of an equator. Accordingly, a location where collision of the satellites 30 can occur varies. The satellites 30 are also called artificial satellites.

Particularly, in recent years, construction of a large-scale satellite constellation consisting of several hundred to several thousand satellites has started, and a risk of satellite collision on the orbit is increasing. In addition, space debris such as artificial satellites that have become uncontrollable due to failure, and rocket wreckage, are increasing. The large-scale satellite constellation is also called a mega-constellation. Such debris is also called space debris.

In this manner, as the debris increases in outer space and a number of satellites typically represented by mega-constellations increases rapidly, demands for space traffic management (STM) have arisen.

Also, to realize orbital transfer of a space object, demands have arisen for post-mission disposal (PMD) that takes place after a mission on the orbit is ended, or for ADR according to which debris such as a failed satellite and a floating upper block of a rocket is subjected to orbital disposal by an external means such as a debris removal satellite. International discussion for STM about such ADR demands has begun. PMD stands for Post Mission Disposal. ADR stands for Active Debris Removal. STM stands for Space Traffic Management.

With referring to FIGS. 5 to 8, description will be made on an example of a satellite 30 and a ground facility 700 in a satellite constellation forming system 600 which forms the satellite constellation 20. For example, the satellite constellation forming system 600 is operated by a business operator that runs a satellite constellation business of a mega-constellation business device 41, an LEO constellation business device, a satellite business device, or the like. LEO stands for Low Earth Orbit.

A satellite control scheme using the satellite constellation forming system 600 is also applied to a business device 40 that controls a satellite. For example, this satellite control scheme may be loaded in a business device 40 such as a debris removal business device 45 to manage a debris removal satellite, a rocket launch business device 46 to launch a rocket, and an orbital transfer business device to manage an orbital transfer satellite.

The satellite control scheme using the satellite constellation forming system 600 may be loaded in any business device as far as it is a business device of a business operator that manages a space object 60.

Individual devices of the business devices 40 will be described later.

Figure 5:
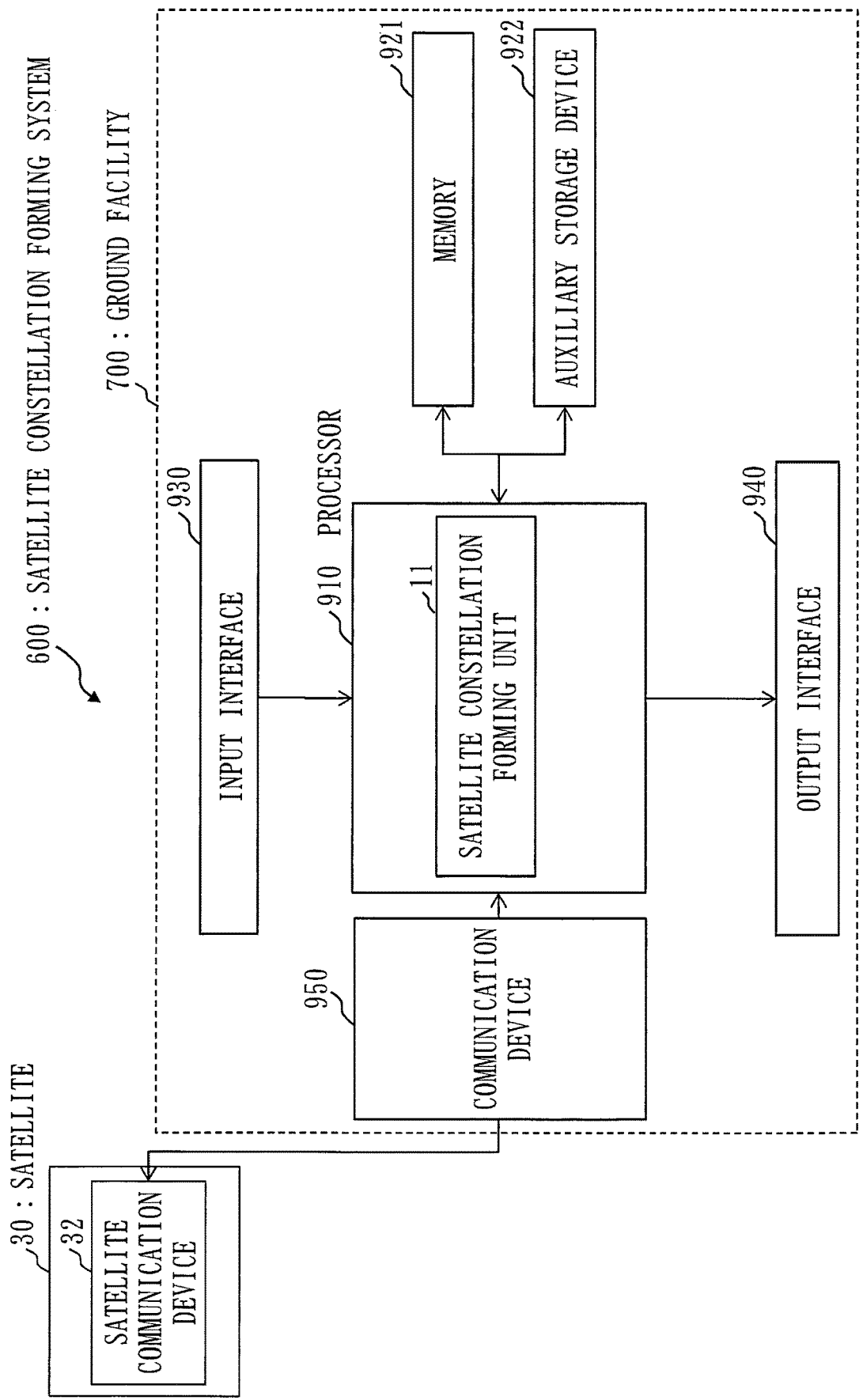
FIG. 5 is a configuration diagram of a satellite constellation forming system.

FIG. 5 is a configuration diagram of the satellite constellation forming system 600.

The satellite constellation forming system 600 is provided with a computer. FIG. 5 illustrates a one-computer configuration. In practice, computers are provided to the individual satellites 30 of the plurality of satellites constituting the satellite constellation 20 and to the ground facility 700 which communicates with the satellites 30. The computers provided to the individual satellites 30 of the plurality of satellites and to the ground facility 700 communicating with the satellites 30 cooperate with each other to implement functions of the satellite constellation forming system 600. In the following, an example of a configuration of a computer that implements the functions of the satellite constellation forming system 600 will be described.

The satellite constellation forming system 600 is provided with the satellites 30 and the ground facility 700. Each satellite 30 is provided with a satellite communication device 32 to communicate with a communication device 950 of the ground facility 700. FIG. 5 illustrates the satellite communication device 32 among configurations provided to the satellite 30.

The satellite constellation forming system 600 is provided with a processor 910 and other hardware devices as well, such as a memory 921, an auxiliary storage device 922, an input interface 930, an output interface 940, and a communication device 950. The processor 910 is connected to the other hardware devices via a signal line and controls the other hardware devices. The hardware of the satellite constellation forming system 600 is the same as hardware of a space traffic management device 100 to be described later with referring to FIG. 9.

The satellite constellation forming system 600 is provided with a satellite constellation forming unit 11 as a function element. A function of the satellite constellation forming unit 11 is implemented by hardware or software.

The satellite constellation forming unit 11 controls formation of the satellite constellation 20 while communicating with the satellites 30.

Figure 6:
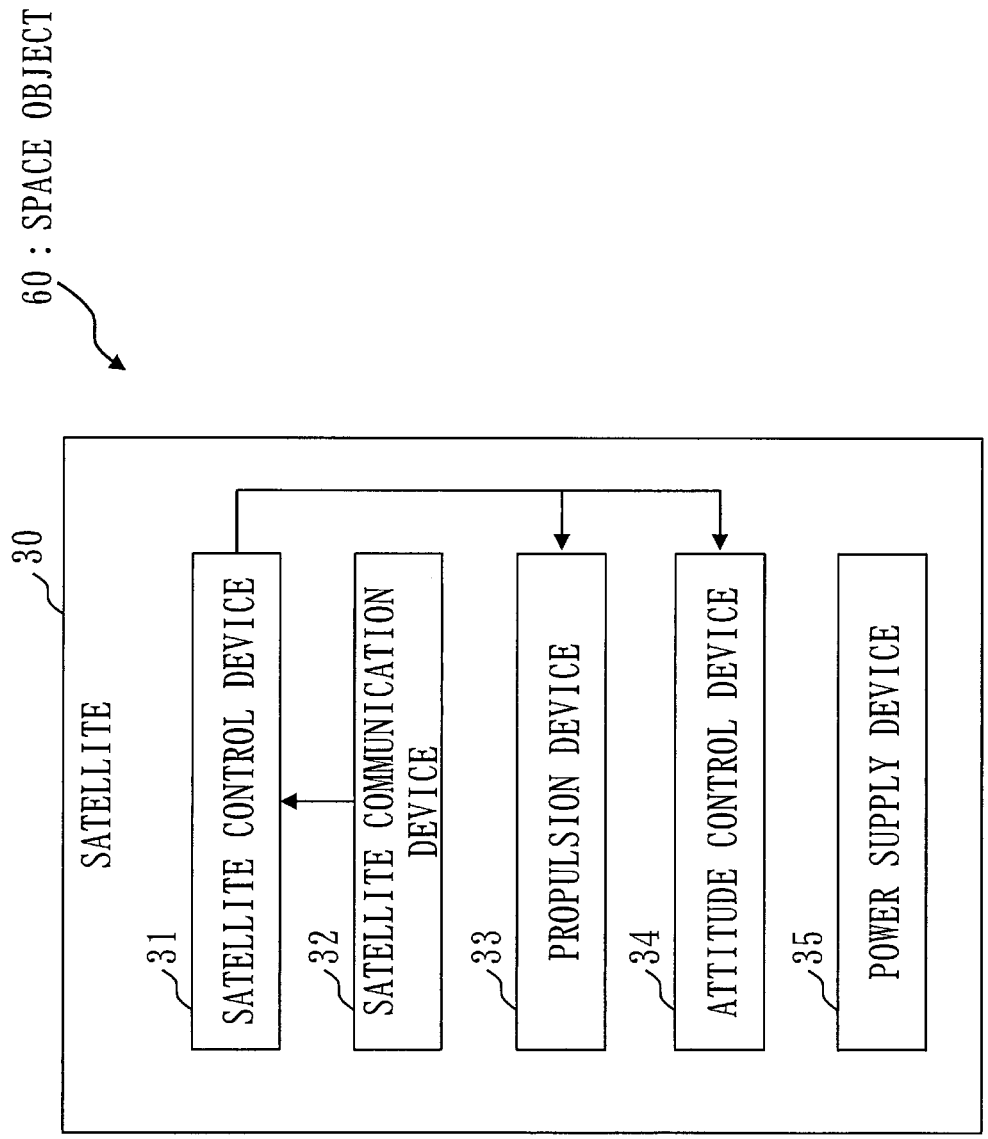
FIG. 6 is a configuration diagram of a satellite of the satellite constellation forming system.

FIG. 6 is a configuration diagram of the satellite 30 of the satellite constellation forming system 600.

The satellite 30 is provided with a satellite control device 31, a satellite communication device 32, a propulsion device 33, an attitude control device 34, and a power supply device 35. The satellite 30 is also provided with other constituent elements that implement various types of functions. With referring to FIG. 6, description will be made on the satellite control device 31, the satellite communication device 32, the propulsion device 33, the attitude control device 34, and the power supply device 35. The satellite 30 is an example of the space object 60.

The satellite control device 31 is a computer that controls the propulsion device 33 and the attitude control device 34, and is provided with a processing circuit. Specifically, the satellite control device 31 controls the propulsion device 33 and the attitude control device 34 in accordance with various types of commands transmitted from the ground facility 700.

The satellite communication device 32 is a device that communicates with the ground facility 700. Specifically, the satellite communication device 32 transmits various types of data concerning its own satellite to the ground facility 700. The satellite communication device 32 receives various types of commands transmitted from the ground facility 700.

The propulsion device 33 is a device to give propulsion to the satellite 30 and changes a speed of the satellite 30. Specifically, the propulsion device 33 is an apogee kick motor, a chemical propulsion device, or an electric propulsion device. The apogee kick motor (AKM) refers to an upper-block propulsion device used for orbit insertion of an artificial satellite, and is also called an apogee motor (when a solid rocket motor is employed) or an apogee engine (when a liquid engine is employed).

The chemical propulsion device is a thruster that uses a one-component or two-component fuel. An example of the electric propulsion device is an ion engine or a Hall thruster. Apogee kick motor is a name of a device used for orbital transfer, and is sometimes a kind of chemical propulsion device.

The attitude control device 34 is a device to control attitude elements such as an attitude of the satellite 30, an angular velocity of the satellite 30, and a Line of Sight. The attitude control device 34 changes the attitude elements into desired directions. Alternatively, the attitude control device 34 maintains the attitude elements in desired directions. The attitude control device 34 is provided with an attitude sensor, an actuator, and a controller. The attitude sensor is a device such as a gyroscope, an Earth sensor, a sun sensor, a star tracker, a thruster, and a magnetic sensor. The actuator is a device such as an attitude control thruster, a momentum wheel, a rection wheel, and a control moment gyro. The controller controls the actuator in accordance with measurement data of the attitude sensor or various types of commands from the ground facility 700.

The power supply device 35 is provided with apparatuses such as a solar cell, a battery, and a power control device, and supplies power to the apparatuses mounted in the satellite 30.

The processing circuit provided to the satellite control device 31 will be described.

The processing circuit may be dedicated hardware, or may be a processor that runs a program stored in the memory.

In the processing circuit, some of its functions may be implemented by dedicated hardware, and its remaining functions may be implemented by software or firmware. That is, the processing circuit can be implemented by hardware, software, or firmware; or a combination of hardware, software, and firmware.

The dedicated hardware is specifically a single circuit, a composite circuit, a programmed processor, a parallel-programmed processor, an ASIC, or an FPGA; or a combination of a single circuit, a composite circuit, a programmed processor, a parallel-programmed processor, an ASIC, and an FPGA.

ASIC stands for Application Specific Integrated Circuit. FPGA stands for Field Programmable Gate Array.

Figure 7:
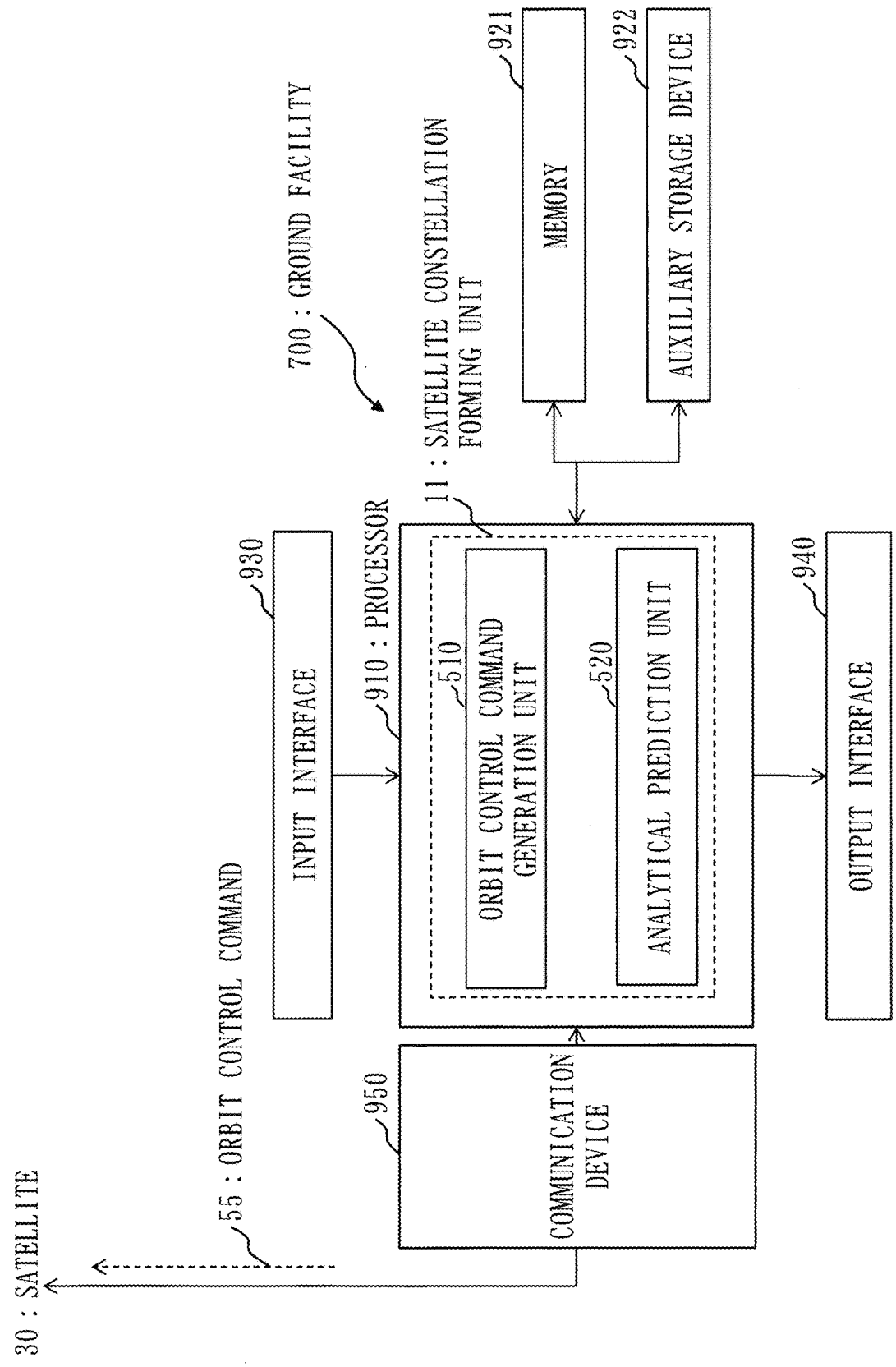
FIG. 7 is a configuration diagram of a ground facility of the satellite constellation forming system.

FIG. 7 is a configuration diagram of the ground facility 700 provided to the satellite constellation forming system 600.

The ground facility 700 program-controls a large number of satellites on every orbital plane. The ground facility 700 is an example of a ground device. The ground device is constituted of: a ground station including, for example, a ground antenna device, a communication device connected to the ground antenna device, and an electronic calculator; and a ground facility serving as a server or terminal connected to the ground station via a network. The ground device may include a communication device mounted in a mobile body such as an aircraft, an automotive vehicle, and a mobile terminal.

The ground facility 700 forms the satellite constellation 20 through communication with the satellites 30. The ground facility 700 is provided to the space traffic management device 100. The ground facility 700 is provided with the processor 910 and other hardware devices such as the memory 921, the auxiliary storage device 922, the input interface 930, the output interface 940, and the communication device 950. The processor 910 is connected to the other hardware devices via the signal line and controls the other hardware devices. The hardware of the ground facility 700 is the same as hardware of the space traffic management device 100 to be described later with referring to FIG. 9.

The ground facility 700 is provided with an orbit control command generation unit 510 and an analytical prediction unit 520, as function elements. Functions of the orbit control command generation unit 510 and analytical prediction unit 520 are implemented by hardware or software.

The communication device 950 transmits and receives a signal that performs tracking control of the satellites 30 of the satellite group 300 constituting the satellite constellation 20. Also, the communication device 950 transmits an orbit control command 55 to the satellites 30.

The analytical prediction unit 520 analytically predicts orbits of the satellites 30.

The orbit control command generation unit 510 generates the orbit control command 55 to be transmitted to the satellites 30.

The orbit control command generation unit 510 and the analytical prediction unit 520 implement the function of the satellite constellation forming unit 11. That is, the orbit control command generation unit 510 and the analytical prediction unit 520 are examples of the satellite constellation forming unit 11.

Figure 8:
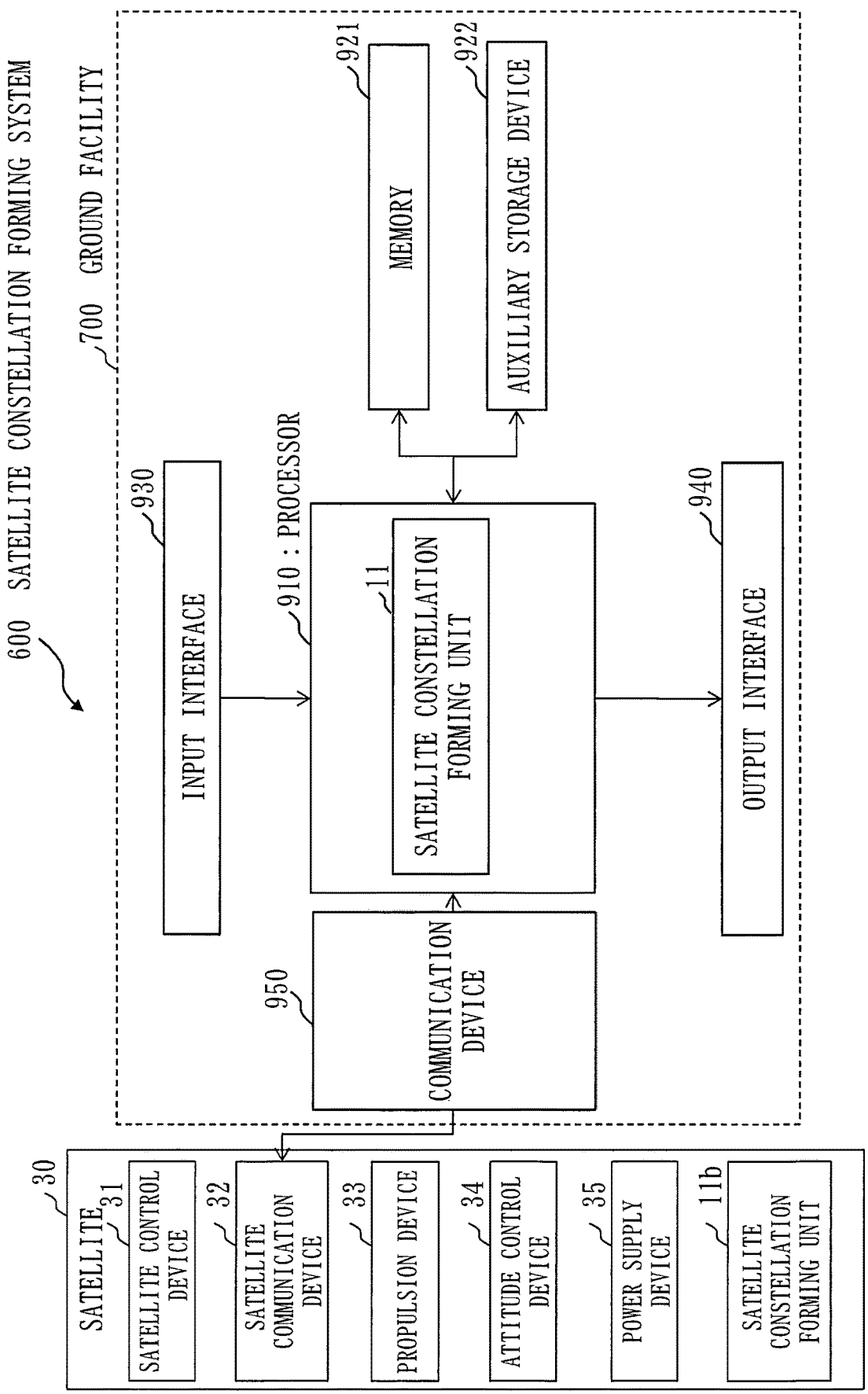
FIG. 8 presents a function configuration example of the satellite constellation forming system.

FIG. 8 is a diagram illustrating a function configuration example of the satellite constellation forming system 600.

The satellite 30 is further provided with a satellite constellation forming unit 11b which forms the satellite constellation 20. The satellite constellation forming units 11b of the individual satellites 30 of the plurality of satellites and the satellite constellation forming unit 11 provided to the ground facility 700 cooperate with each other to implement the functions of the satellite constellation forming system 600. Alternatively, the satellite constellation forming unit 11b of the satellite 30 may be provided to the satellite control device 31.

* Description of Configurations *

A space traffic management system 500 according to the present embodiment is provided with a debris removal business device 45 and a plurality of mega-constellation business devices 41. The debris removal business device 45 assists avoidance of collision of space objects with each other in outer space. The mega-constellation business devices 41 manage mega-constellations which are satellite constellations each consisting of 100 or more satellites.

The space traffic management device 100 according to the present embodiment is mounted in the debris removal business device 45 and in each of the plurality of mega-constellation business devices 41, and is provided with a database 211 and a server 212. A space traffic management device 100 may be mounted in a space insurance business device of a space insurance business operator which runs a space insurance business.

In the space traffic management system 500, the space traffic management devices 100 individually mounted in the debris removal business device 45, the plurality of mega-constellation business devices 41, and the space insurance business device are connected to each other via a communication line.

Figure 9:
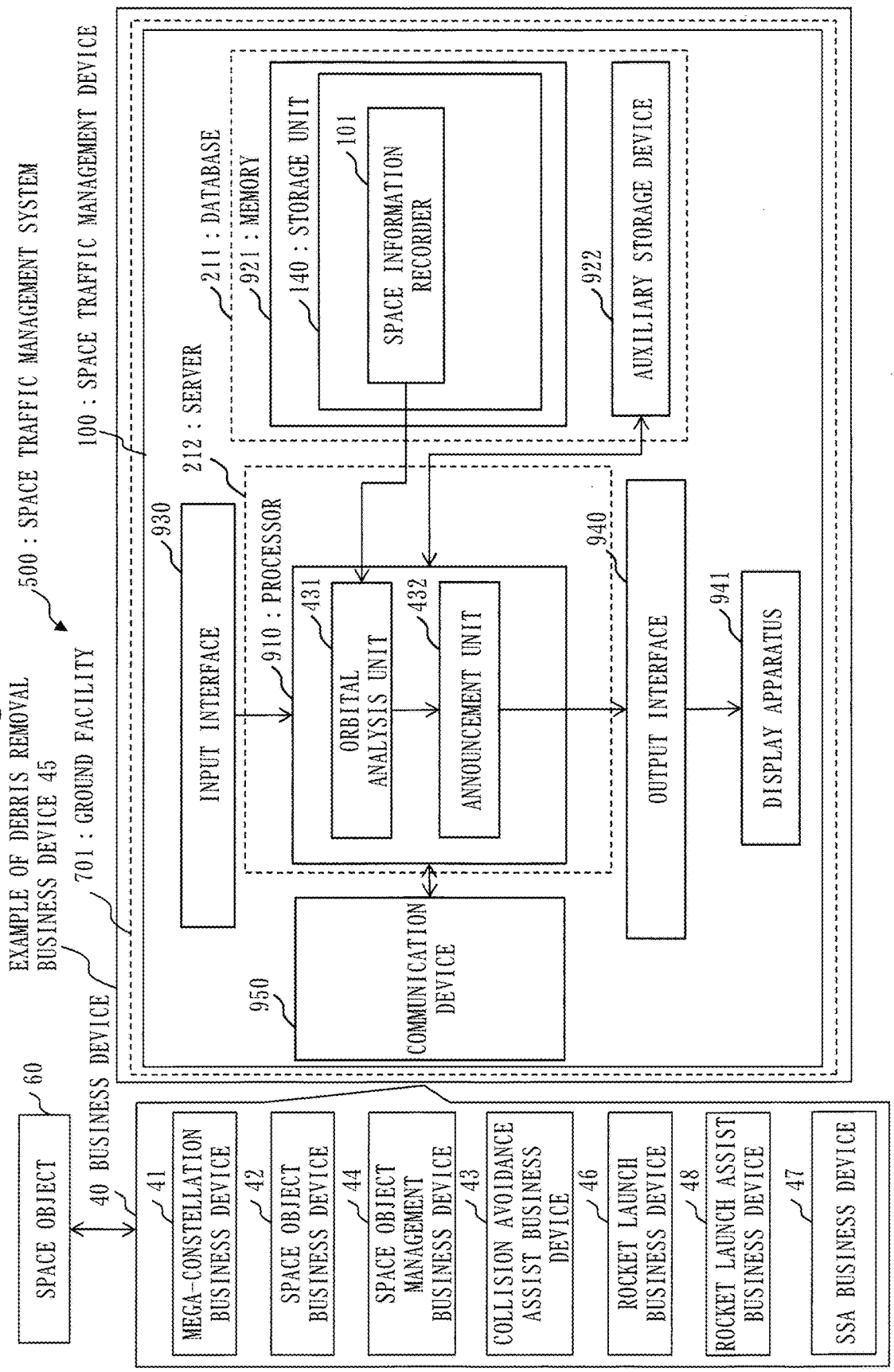
FIG. 9 presents a hardware configuration example of a space traffic management device of a debris removal business device according to Embodiment 1.

FIG. 9 is a diagram illustrating a hardware configuration example of the space traffic management device 100 of the debris removal business device 45 according to the present embodiment.

Figure 10:
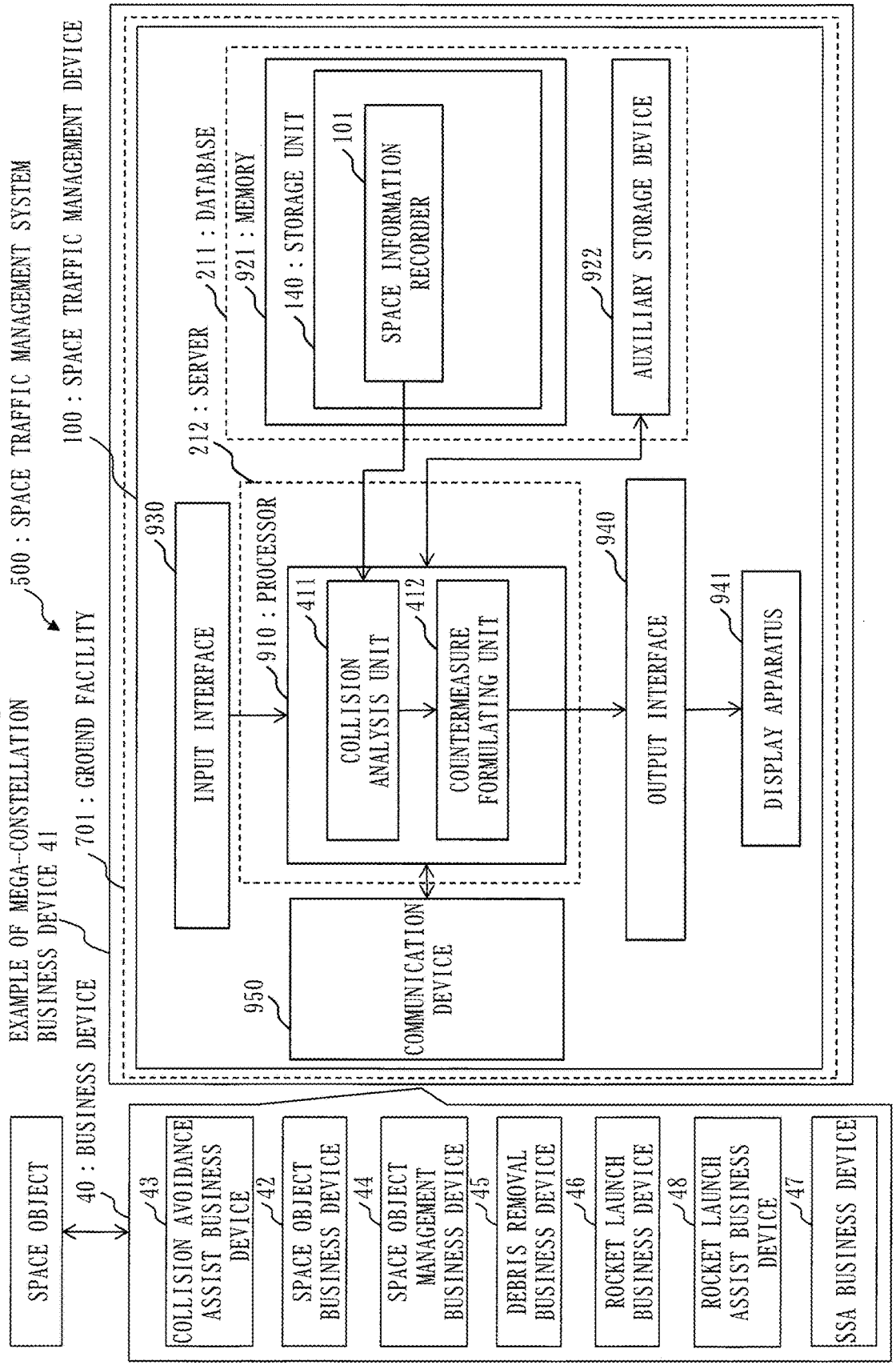
FIG. 10 presents a hardware configuration example of a space traffic management device of a mega-constellation business device according to Embodiment 1.

FIG. 10 is a diagram illustrating a hardware configuration example of the space traffic management device 100 of the mega-constellation business device 41 according to the present embodiment.

In the present embodiment, the space traffic management devices 100 are individually mounted in the mega-constellation business devices 41, a space object business device 42, a collision avoidance assist business device 43, a space object management business device 44, the debris removal business device 45, the rocket launch business device 46, an SSA (Space Situational Awareness) business device 47, and a rocket launch assist business device 48.

In the present embodiment, the mega-constellation business devices 41 are included in a plurality of mega-constellation business devices including a first mega-constellation business device 418 and a second mega-constellation business device 419.

The mega-constellation business device 41 manages the satellite constellation consisting of a plurality of satellites. Specifically, the mega-constellation business device 41 is a computer of a mega-constellation business operator which runs a large-scale satellite constellation business, that is, a mega-constellation business. The mega-constellation business device 41 is an example of a satellite constellation business device that manages a satellite constellation consisting of, for example, 100 or more satellites.

The business devices 40 include the individual business devices described above. Each business device 40 provides information concerning the space object 60 such as an artificial satellite managed by each device, and debris. The business device 40 is a computer of a business operator which collects information concerning the space object 60 such as the artificial satellite and debris.

For example, the LEO constellation business device is a computer of an LEO constellation business operator which runs a low-Earth-orbit constellation business, that is, an LEO constellation business.

The satellite business device is a computer of a satellite business operator which deals with one to several satellites.

The orbital transfer business device is a computer of an orbital transfer business operator which issues a space object intrusion alarm about a satellite.

The collision avoidance assist business device 43 assists avoidance of collision of space objects with each other in outer space. Specifically, the collision avoidance assist business device 43 is a computer of a collision avoidance assist business operator which assists avoidance of collision of space objects with each other in outer space.

The debris removal business device 45 is a computer of a debris removal business operator which runs a business of collecting debris.

The rocket launch business device 46 is a computer of a rocket launch business operator which runs a rocket launch business.

The rocket launch assist business device 48 is a computer of the rocket launch business operator which runs the rocket launch business.

The SSA business device 47 is a computer of an SSA business operator which runs an SSA business, that is, a space situational awareness business. The SSA business device is also called a space situational awareness business device.

The space object business device 42 is a business device that manages an unsteady-operation space object.

The space object management business device 44 is a business device that manages a deorbiting space object in an orbital descent process.

A space traffic management device 100 may be mounted in a ground facility 701 provided to each business device 40. A space traffic management device 100 may be mounted in the satellite constellation forming system 600.

The space traffic management device 100 is provided with a processor 910, and is provided with other hardware devices as well, such as a memory 921, an auxiliary storage device 922, an input interface 930, an output interface 940, and a communication device 950. The processor 910 is connected to the other hardware devices via a signal line and controls the other hardware devices.

The processor 910 is an example of a server. The memory 921 and the auxiliary storage device 922 are examples of the database 211. The server 212 may be provided with other hardware devices such as an input interface 930, an output interface 940, a communication device 950, and a storage apparatus. The server 212 implements individual functions of the mega-constellation business device 41, the space object business device 42, the collision avoidance assist business device 43, the space object management business device 44, the debris removal business device 45, the rocket launch business device 46, the SSA business device 47, and the rocket launch assist business device 48.

As illustrated in FIG. 9, the space traffic management device 100 of the debris removal business device 45 is provided with an orbital analysis unit 431, an announcement unit 432, and a storage unit 140, as examples of function elements that implement a collision avoidance assist function. A space information recorder 101 is stored in the storage unit 140.

As illustrated in FIG. 10, the space traffic management device 100 of the mega-constellation business device 41 is provided with a collision analysis unit 411, a countermeasure formulating unit 412, and a storage unit 140, as examples of function elements that implement a mega-constellation management function. A space information recorder 101 is stored in the storage unit 140.

FIGS. 9 and 10 illustrate examples of the individual business device 40. The debris removal business device 45 may be provided with all or some of the orbital analysis unit 431, the announcement unit 432, the collision analysis unit 411, and the countermeasure formulating unit 412. Alternatively, the mega-constellation business device 41 may be provided with all or some of the orbital analysis unit 431, the announcement unit 432, the collision analysis unit 411, and the countermeasure formulating unit 412.

In the following, a hardware configuration of the space traffic management device 100 will be described with referring to FIG. 9, using the space traffic management device 100 of the debris removal business device 45 as an example. Note that the space traffic management device 100 of another business device 40 has the same hardware configuration.

To simplify the description, a configuration having the same function is denoted by the same reference sign. However, each of the mega-constellation business device 41, the debris removal business device 45, and the space insurance business device individually has a hardware configuration and a function configuration individually.

Functions of the orbital analysis unit 431 and announcement unit 432 are implemented by software. The storage unit 140 is provided to the memory 921. Alternatively, the storage unit 140 may be provided to the auxiliary storage device 922. Also, the storage unit 140 may be provided to the memory 921 and the auxiliary storage device 922 dividedly.

FIG. 9 describes the space traffic management device 100 as a device that implements a function of collision avoidance assistance. However, the space traffic management device 100 has various functions other than the function of collision avoidance assistance.

The processor 910 is a device that runs a space traffic management program. The space traffic management program is a program that implements the functions of various constituent elements of the space traffic management device 100 and space traffic management system 500.

The processor 910 is an Integrated Circuit (IC) that performs computation processing. Specific examples of the processor 910 are a Central Processing Unit (CPU), a Digital Signal Processor (DSP), and a Graphics Processing Unit (GPU).

The memory 921 is a storage device that stores data temporarily. A specific example of the memory 921 is a Static Random-Access Memory (SRAM) or a Dynamic Random-Access Memory (DRAM).

The auxiliary storage device 922 is a storage device that keeps data. A specific example of the auxiliary storage device 922 is an HDD. Alternatively, the auxiliary storage device 922 may be a portable storage medium such as an SD (registered trademark) memory card, a CF, a NAND flash, a flexible disk, an optical disk, a compact disk, a Blu-ray (registered trademark) Disc, and a DVD. HDD stands for Hard Disk Drive. SD (registered trademark) stands for Secure Digital. CF stands for CompactFlash (registered trademark). DVD stands for Digital Versatile Disk.

The input interface 930 is a port to be connected to an input device such as a mouse, a keyboard, and a touch panel. The input interface 930 is specifically a Universal Serial Bus (USB) terminal. Alternatively, the input interface 930 may be a port to be connected to a Local Area Network (LAN).

The output interface 940 is a port to which a cable of a display apparatus 941 such as a display is to be connected. The output interface 940 is specifically a USB terminal or a High-Definition Multimedia Interface (HDMI, registered trademark) terminal. The display is specifically a Liquid Crystal Display (LCD).

The communication device 950 has a receiver and a transmitter. The communication device 950 is specifically a communication chip or a Network Interface Card (NIC). In the present embodiment, the space traffic management devices 100 of the mega-constellation business devices 41, space insurance business device, and debris removal business device 45 communicate with each other via the communication line.

The space traffic management program is read by the processor 910 and run by the processor 910. Not only the space traffic management program but also an Operating System (OS) is stored in the memory 921. The processor 910 runs the space traffic management program while running the OS. The space traffic management program and the OS may be stored in the auxiliary storage device 922. The space traffic management program and the OS which are stored in the auxiliary storage device 922 are loaded into the memory 921 and run by the processor 910. Part or a whole of the space traffic management program may be built in the OS.

The space traffic management device 100 may be provided with a plurality of processors that substitute for the processor 910. The plurality of processors share running of the program. Each processor is a device that runs the program, just as the processor 910 does.

Data, information, signal values, and variable values which are used, processed, or outputted by the program are stored in the memory 921, the auxiliary storage device 922, or a register or cache memory in the processor 910.

The term "unit" in each unit of the space traffic management device may be replaced by "process", "procedure", "means", "phase", or "stage". The term "process" in an orbital analysis process and in an alarming process may be replaced by "program", "program product", or "computer-readable recording medium recorded with a program". The terms "process", "procedure", "means", "phase", and "stage" are replaceable with one another.

The space traffic management program causes the computer to execute processes, procedures, means, phases, or stages corresponding to the individual units in the space traffic management system, with the "units" being replaced by "processes", "procedures", "means", "phases", or "stages". A space traffic management method is a method that is carried out by the space traffic management device 100 running the space traffic management program.

The space traffic management program may be provided as being stored in a computer-readable recording medium. Each program may be provided in the form of a program product.

FIG. 11 is a diagram illustrating an example of orbit prediction information 51 provided to the space information recorder 101 according to the present embodiment.

The space traffic management device 100 stores, to the storage unit 140, the orbit prediction information 51 in which prediction values of the orbit of the space object 60 are set. For example, the space traffic management device 100 may acquire prediction values of orbits of a plurality of space objects 60 from the business device 40 utilized by a management business operator which manages the plurality of space objects 60, and may store the acquired prediction values as orbit prediction information 51. Alternatively, the space traffic management device 100 may acquire, from the management business operator, orbit prediction information 51 in which prediction values of orbits of a plurality of space objects 60 are set, and may store the acquired orbit prediction information 51 to the storage unit 140.

The management business operator is a business operator that manages the space object 60 such as a satellite constellation, various types of satellites, a rocket, and debris, which fly in space. As described above, the management business device 40 utilized by each management business operator is a computer such as the mega-constellation business device, the LEO constellation business device, the satellite business device, the orbital transfer business device, the debris removal business device, the rocket launch business device, and the SSA business device.

The orbit prediction information 51 includes satellite orbit prediction information 52 and debris orbit prediction information 53. Prediction values of an orbit of a satellite are set in the satellite orbit prediction information 52. Prediction values of an orbit of debris are set in the debris orbit prediction information 53. In the present embodiment, the satellite orbit prediction information 52 and the debris orbit prediction information 53 are included in the orbit prediction information 51. However, the satellite orbit prediction information 52 and the debris orbit prediction information 53 may be stored in the storage unit 140 as different pieces of information.

Information such as a space object Identifier (ID) 511, a predicted epoch 512, predicted orbital elements 513, and predicted errors 514 are set in the orbit prediction information 51.

The space object ID 511 is an identifier that identifies a space object 60. In FIG. 11, a satellite ID and a debris ID are set as the space object ID 511. The space object is specifically an object such as a rocket to be launched to outer space, an artificial satellite, a space base, a debris removal satellite, a planetary space probe, and a satellite or rocket that has turned into debris after a mission is completed.

The predicted epoch 512 is an epoch predicted for an orbit of each of the plurality of space objects.

The predicted orbital elements 513 are orbital elements that identify an orbit of each of the plurality of space objects. The predicted orbital elements 513 are orbital elements predicted for the orbit of each of the plurality of space objects. In FIG. 11, Keplerian six orbital elements are set as the predicted orbital elements 513.

The predicted errors 514 are errors predicted for the orbit of each of the plurality of space objects. A traveling-direction error, an orthogonal-direction error, and an error basis are set in the predicted errors 514. In this manner, error amounts involved in performance values are explicitly indicated in the predicted errors 514, together with their bases. The bases of the error amounts include contents of data processing carried out as a measurement means and as an accuracy improving means of position coordinate information, and part or a whole of statistic evaluation results of past data.

In the orbit prediction information 51 according to the present embodiment, the predicted epoch 512 and the predicted orbital elements 513 are set concerning the space object 60. A time and position coordinates of the space object 60 in the near future can be obtained from the predicted epoch 512 and the predicted orbital elements 513. For example, the time and position coordinates of the space object 60 in the near future may be set in the orbit prediction information 51.

In this manner, the orbit prediction information 51 is provided with orbital information of the space object, including the epoch and the orbital elements or the time and the position coordinates, to explicitly indicate predicted values of the space object 60 in the near future.

* Description of Functions *

Figure 12:
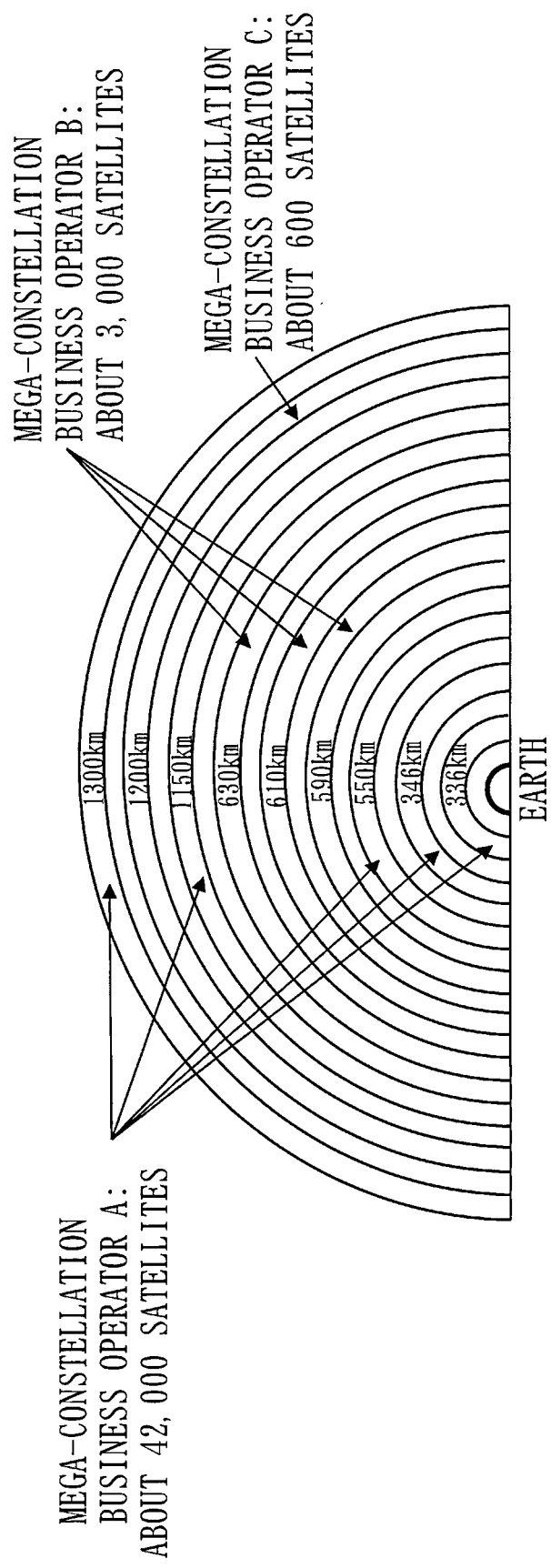
FIG. 12 presents a business example of mega-constellations currently under planning.

FIG. 12 is a diagram of a business example of a mega-constellation which is currently under planning.

Figure 13:
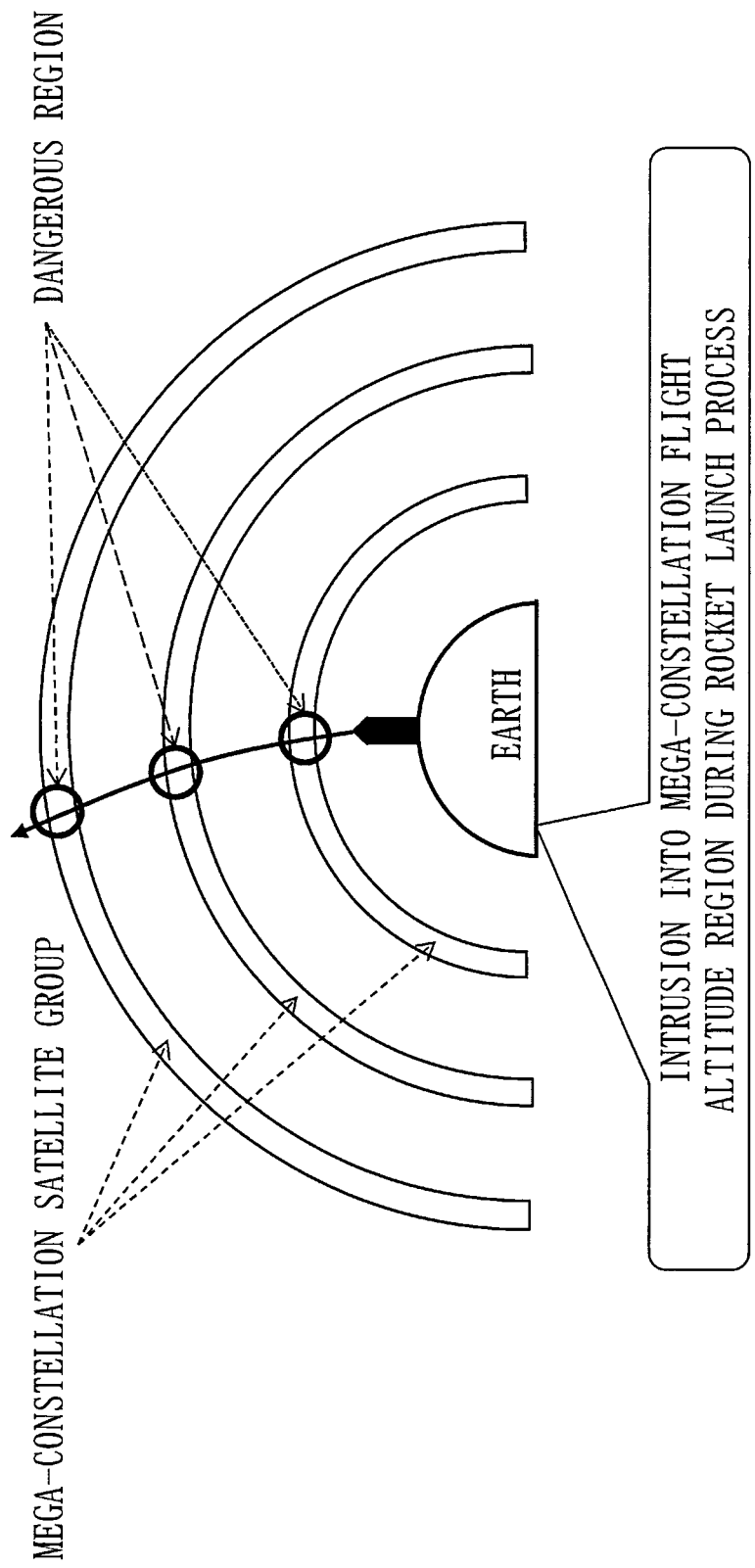
FIG. 13 is a diagram illustrating intrusion of a new launch rocket into mega-constellation satellite groups according to Embodiment 1.

FIG. 13 is a diagram illustrating intrusion of a new launch rocket into mega-constellation satellite groups according to the present embodiment.

Figure 14:
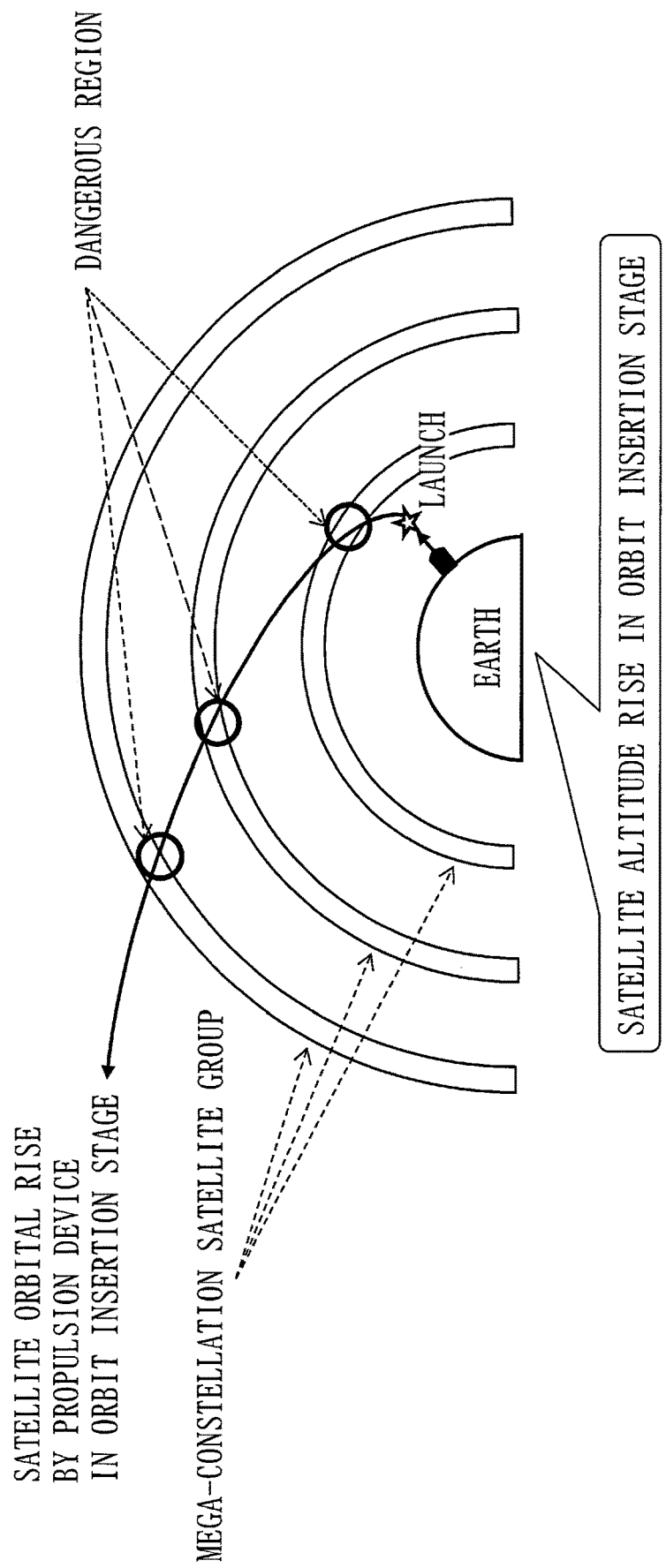
FIG. 14 is a diagram illustrating intrusion of a satellite at an orbit insertion stage into mega-constellation satellite groups according to Embodiment 1.

FIG. 14 is a diagram illustrating intrusion of a satellite at an orbit insertion stage into mega-constellation satellite groups according to the present embodiment.

Figure 15:
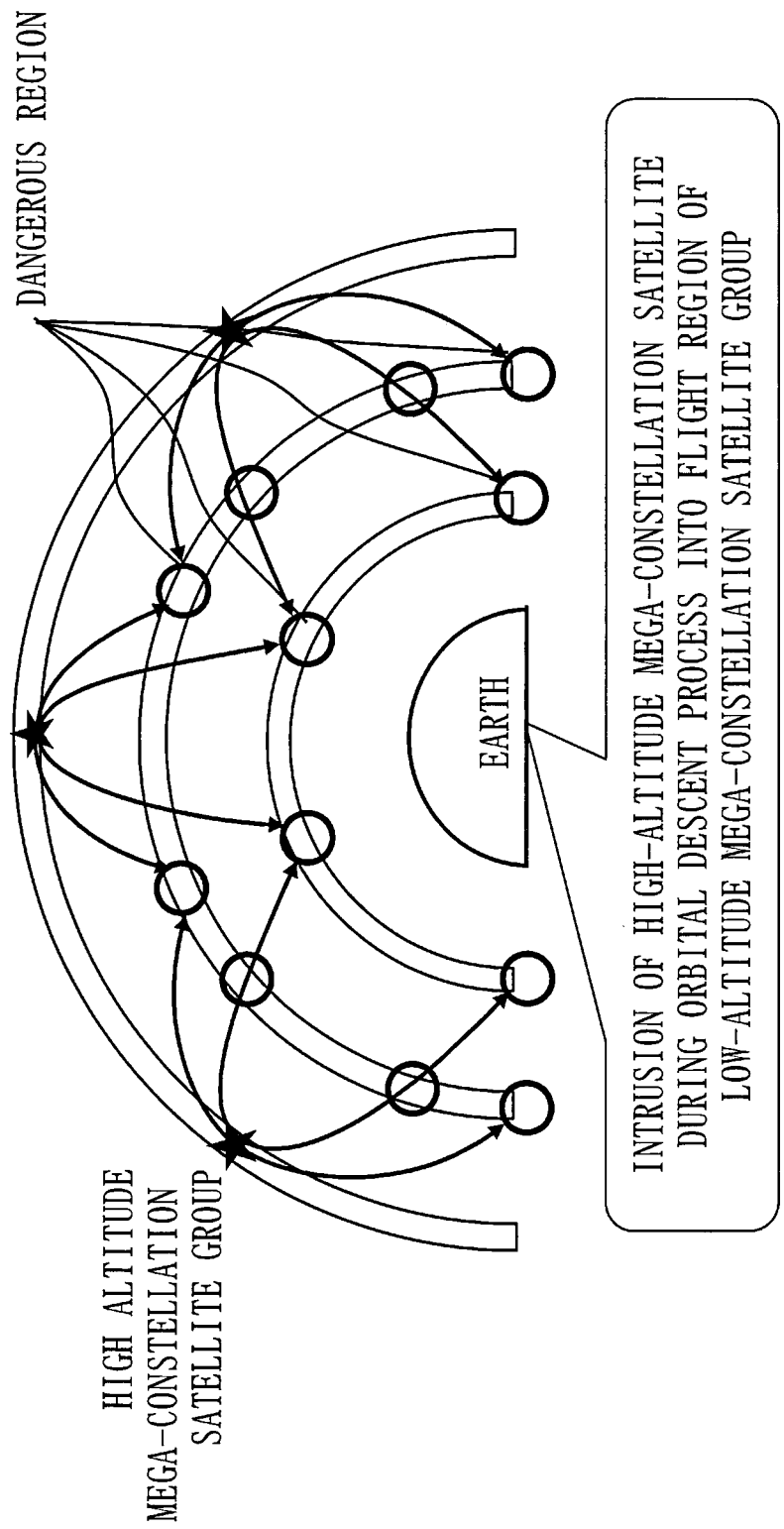
FIG. 15 is a diagram illustrating intrusion of a satellite at an orbital descent stage into mega-constellation satellite groups according to Embodiment 1.

FIG. 15 is a diagram illustrating intrusion of a satellite at an orbital descent stage into mega-constellation satellite groups according to the present embodiment.

As illustrated in FIG. 12, a plurality of mega-constellation business operators advocate a project of deploying many, several hundred to several ten-thousand satellites as if to exhaustively cover the sky.

At the present stage, a mega-constellation business operator A has already announced a deployment project involving about 42,000 satellites, a mega-constellation business operator B has announced a deployment project involving about 3,000 satellites, and a mega-constellation business operator C has announced a deployment project involving about 600 satellites.

As illustrated in FIG. 13, at the stage of deploying mega-constellation satellite groups, as a total number of satellites deployed on orbits increases, a collision risk during new rocket launch increases.

As illustrated in FIG. 14, some satellite business operators announce a project in which after a rocket is launched and a satellite is disconnected, a propulsion device provided to the satellite raises an altitude of the satellite, thereby performing orbit insertion. This is aimed at reducing a risk that a rocket upper block remains as debris. In this case as well, however, as the total number of satellites deployed on the orbit increases, a collision risk during an orbit insertion process increases.

As illustrated in FIG. 15, a collision risk exists even after each mega-constellation business operator has completed deployment of all satellites and steady operation is started. Specifically, after completion of the satellite life, in a process of orbital disposal by PMD and lowering a trajectory altitude until atmospheric entry, a risk exists that a satellite at an orbital descent stage collides with a mega-constellation satellite group that is in steady operation.

In this manner, a space object such as an unsteadily-operation satellite and a rocket poses a collision risk against a mega-constellation satellite group which is deployed as if to exhaustively cover the sky and performs steady operation.

A satellite that has completed a mission performs orbital descent by Post Mission Disposal (PMD), enters atmosphere, and disappears. Active Debris Removal (ADR) by the debris removal business operator is expected to serve as a deorbiting means of a failed satellite or a satellite that cannot perform atmospheric entry on its own on a final stage of on-orbit mission.

When performing ADR of a mega-constellation satellite formed at a high altitude of 1,000 km or more, the satellite must pass through flight altitude regions of a plurality of mega-constellation satellite groups before atmospheric entry, while avoiding collision. When the debris removal business operator is to carry out ADR of a satellite, located at an orbital altitude of 1,300 km, of a mega-constellation business operator A, in an orbital altitude region managed by the mega-constellation business operator A, collision avoidance can be realized if the mega-constellation business operator A shares real-time high-accuracy orbital information with the debris removal business operator.

However, in an orbital altitude region of a mega-constellation satellite group managed by another business operator, real-time high-accuracy orbital information is not available. Hence, there is a risk of collision during orbital descent.

In a mega-constellation satellite group, when a satellite group consisting of up to several thousand satellites flies on the same orbit, if the orbit is a polar orbit having an orbital inclination of almost 90° as illustrated in FIG. 3, a satellite density is high in polar regions where all orbital planes meet. Therefore, in the polar regions, strict passing timing control must be performed for ensuring flight safety.

Meanwhile, if the orbit is an inclined orbit having an orbital inclination far from 90° as illustrated in FIG. 4, a collision risk exists at an orbital-plane intersection in a middle-latitude region. Therefore, to ensure flight safety by shifting a satellite passing timing at every lattice intersection, strict passing timing control must be performed.

In order to realize such strict passing timing control, the individual satellite groups fly while constantly operating propulsion devices.

A procedure of ensuring flight safety requires performing danger analysis first of all, such as approach analysis and collision analysis. To perform high-accuracy danger analysis, high-accuracy orbital information of a space object is indispensable.

As described above, however, in mega-constellation satellite groups, the individual satellite groups fly while constantly operating the propulsion device, in order to realize strict passing timing control. Hence, accurate position information cannot be grasped unless the orbital information is updated in a real-time manner. It is rational to consider that only business operators which manage individual mega-constellation satellite groups can manage real-time high-accuracy orbital information of several hundred to several ten-thousand satellites.

Under these circumstances, a method of avoiding collision is available with which the debris removal business operator acquires real-time high-accuracy orbital information of a mega-constellation satellite group of another business operator for only a flight orbital altitude region passing timeframe of another business operator limitedly. A method is also available with which the debris removal business operator issues a danger alarm and the mega-constellation satellite group side performs danger analysis and a collision avoidance action.

In the present embodiment, description will be made on a function of the debris removal business device, a function of the first mega-constellation business device that requests the debris removal business device to perform ADR of debris which the mega-constellation business device manages, and a function of the second mega-constellation business device about which debris intrusion is predicted.

* Description of Operations *

<Function of Space Traffic Management System 500>

Examples of operations and of a debris removal method by the space traffic management system 500 according to the present embodiment will now be described with referring to FIGS. 16 to 19. The hardware configurations of the individual space traffic management devices 100 have been described above. An operation procedure of the space traffic management system 500 corresponds to the space traffic management method. A program that implements the operations of the space traffic management system 500 corresponds to the space traffic management program. The space traffic management method is also called a debris removal method. The space traffic management program is also called a debris removal program.

Figure 16:
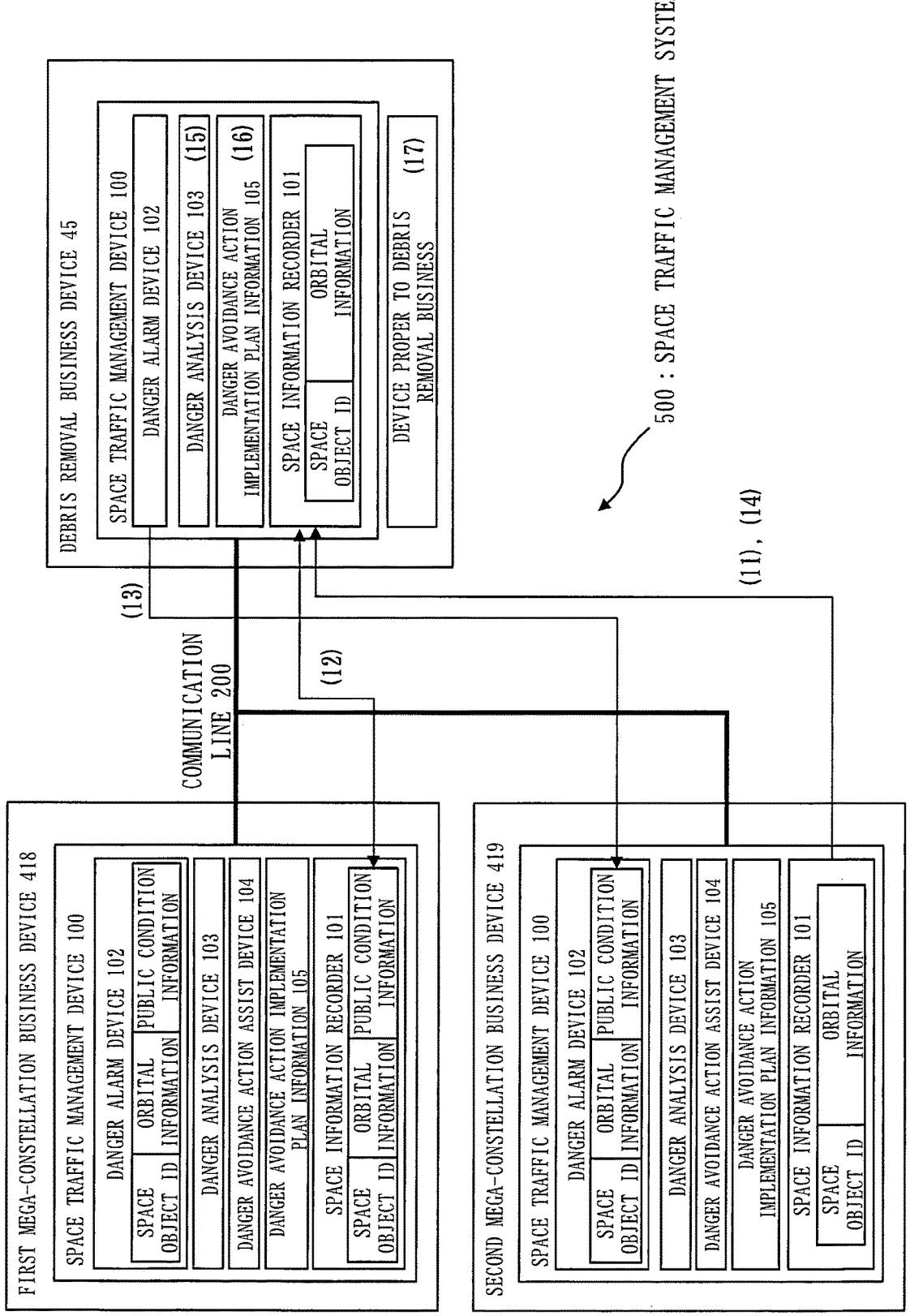
FIG. 16 presents an overall configuration example (Example 1) of a space traffic management system according to Embodiment 1.

FIG. 16 is a diagram illustrating an overall configuration example (Example 1) of the space traffic management system 500 according to the present embodiment.

Figure 17:
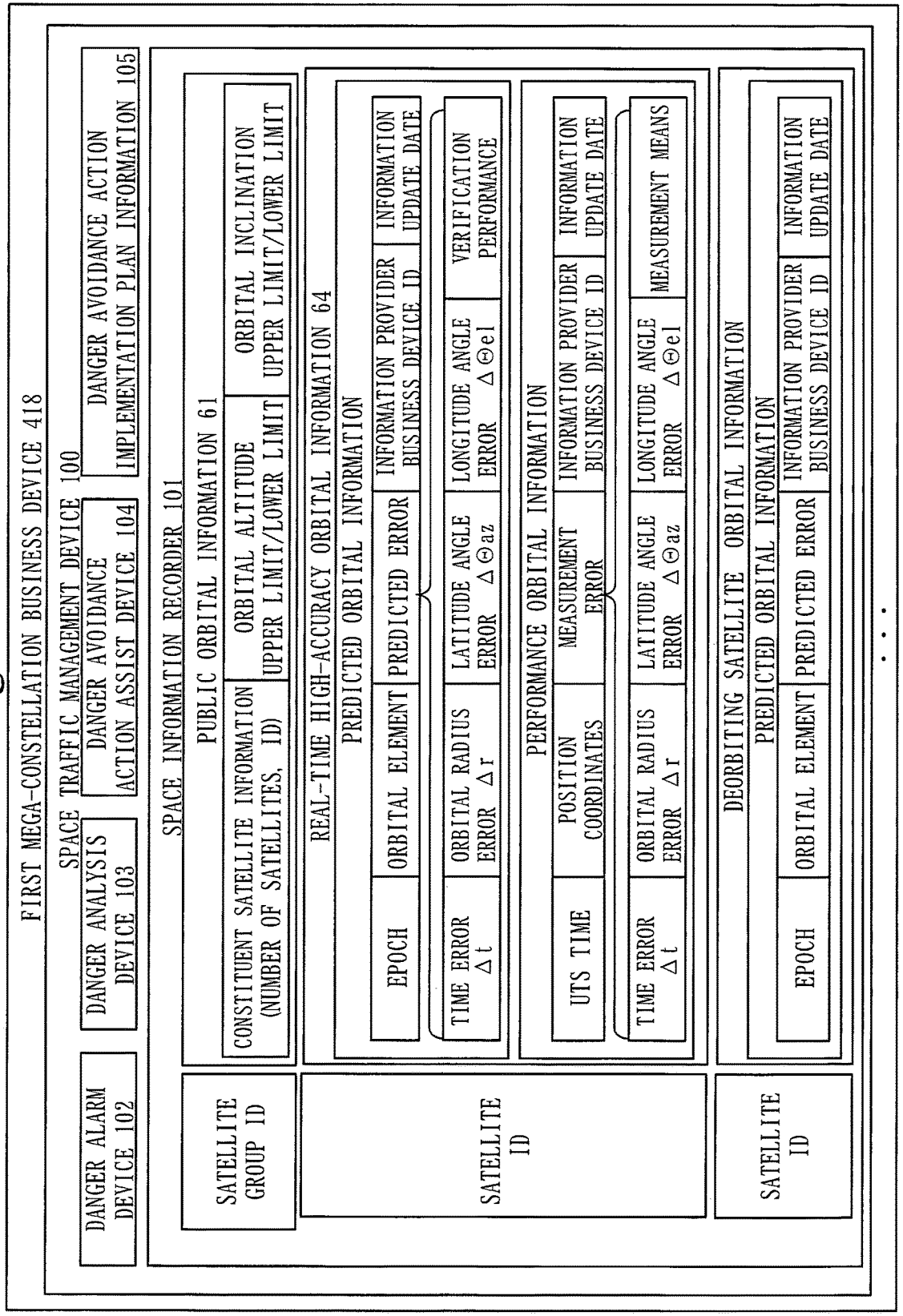
FIG. 17 presents a detailed configuration example of a first mega-constellation business device according to Embodiment 1.

FIG. 17 is a diagram illustrating a detailed configuration example of the first mega-constellation business device 418 according to the present embodiment.

Figure 18:
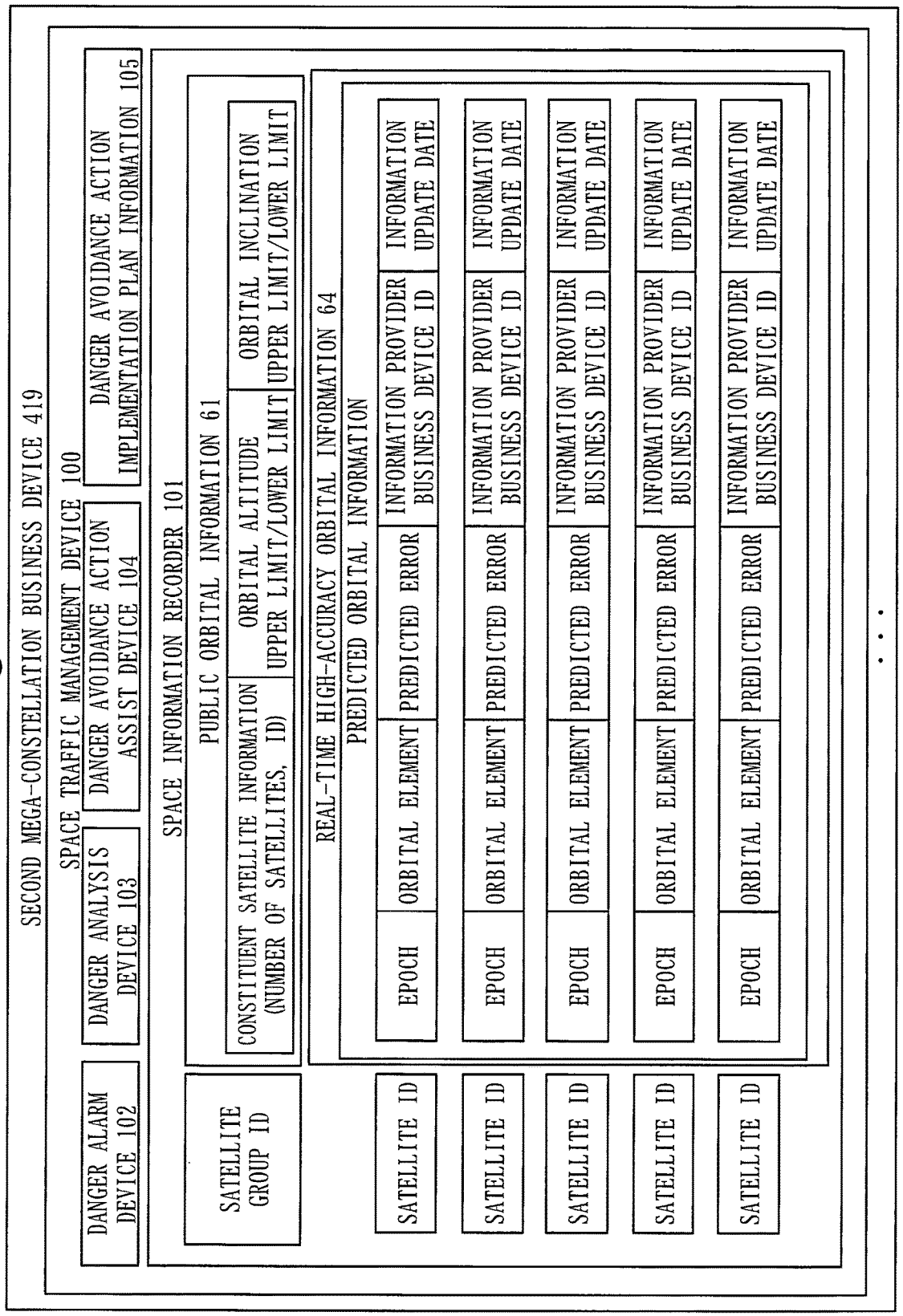
FIG. 18 presents a detailed configuration example of a second mega-constellation business device according to Embodiment 1.

FIG. 18 is a diagram illustrating a detailed configuration example of the second mega-constellation business device 419 according to the present embodiment.

Figure 19:
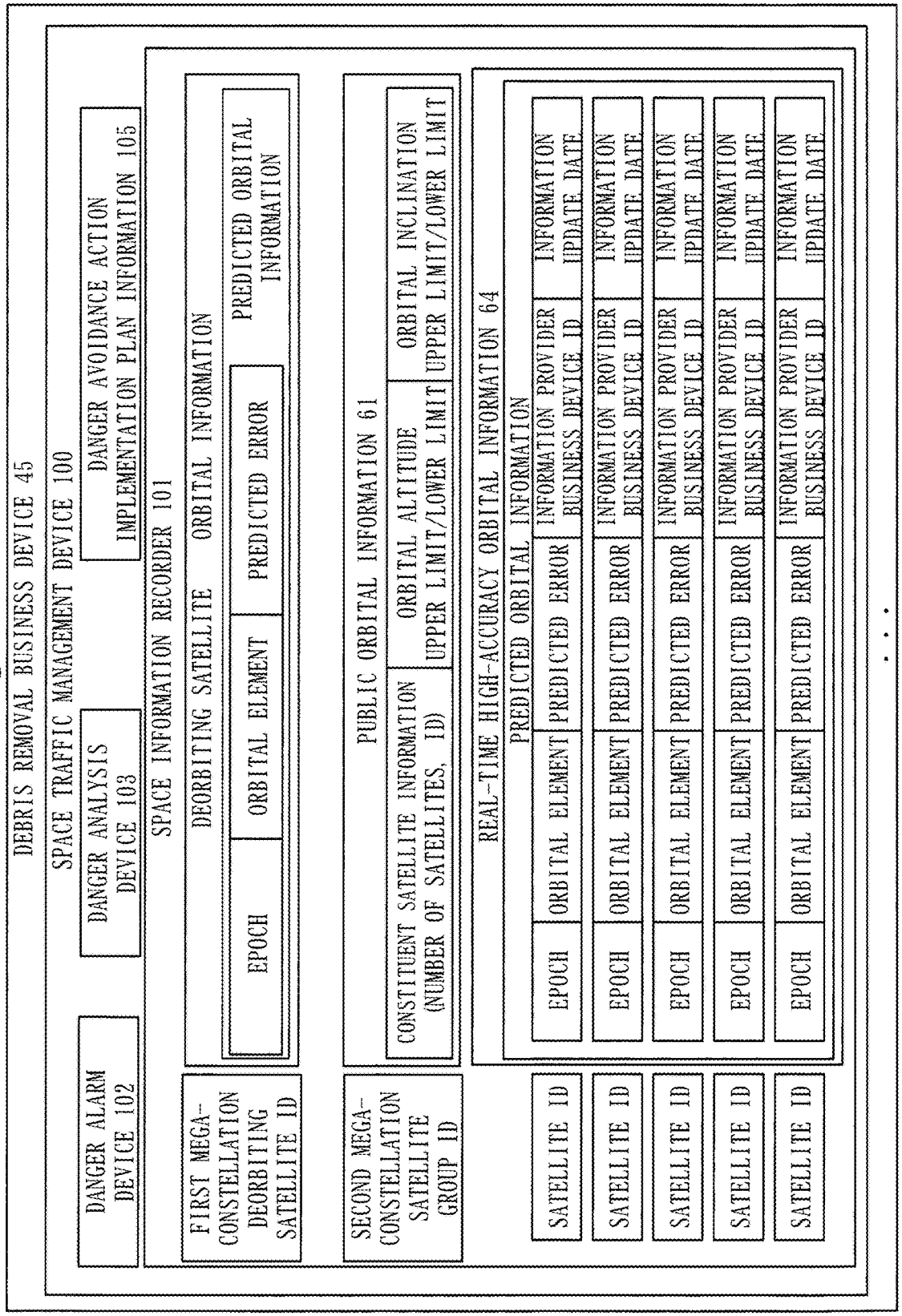
FIG. 19 presents a detailed configuration example of a debris removal business device according to Embodiment 1.

FIG. 19 is a diagram illustrating a detailed configuration example of the debris removal business device 45 according to the present embodiment.

The plurality of space traffic management devices 100 provided to the space traffic management system 500 are connected to each other via a communication line 200. The space traffic management devices 100 are individually mounted in the first mega-constellation business device 418 and the second mega-constellation business device 419 which are the plurality of mega-constellation business devices 41, and in the debris removal business device 45.

<Mega-Constellation Business Device 41>

The first mega-constellation business device 418 is a business device of a first mega-constellation business operator that requests the debris removal business operator to perform ADR of debris such as a rocket part of a satellite constituting a first mega-constellation which the first mega-constellation business operator manages.

The second mega-constellation business device 419 is a business device of a second mega-constellation business operator that manages a second mega-constellation through which the first mega-constellation passes during deorbiting.

In the following, assume that when the mega-constellation business device 41 is mentioned, it refers to each of or at least either one of the first mega-constellation business device 418 and the second mega-constellation business device 419.

The space traffic management device 100 of the mega-constellation business device 41 is provided with the space information recorder 101, a danger alarm device 102, a danger analysis device 103 which performs orbital analysis of a space object, a danger avoidance action assist device 104, and a danger avoidance action implementation plan information 105.

The space information recorder 101 of the mega-constellation business device 41 records orbital information of satellites constituting a mega-constellation.

The space information recorder 101 is provided with public orbital information associated with a satellite group ID that identifies a satellite group.

The public orbital information is orbital information that can be disclosed to the other business devices. Constituent satellite information such as a number of satellites constituting the satellite group and satellite IDs of the satellites, an upper limit and lower limit of an orbital altitude of the satellite group, and an upper limit and lower limit of an orbital inclination of the satellite group are set in the public orbital information.

The space information recorder 101 is provided with real-time high-accuracy orbital information 64 associated with satellite IDs that identify individual satellites constituting the satellite group.

In the first mega-constellation business device 418, predicted orbital information and performance orbital information are provided to the real-time high-accuracy orbital information 64. A specific example of the predicted orbital information is the orbit prediction information 51 of FIG. 12. The performance orbital information has the same configuration as that of the predicted orbital information. Furthermore, predicted orbital information of a deorbiting satellite is also set.

The second mega-constellation business device 419 suffices if the real-time high-accuracy orbital information 64 has predicted orbital information of each satellite.

The danger alarm device 102 announces danger of approach or collision of a space object. The danger alarm device 102 is provided with orbital information associated with a space object ID that identifies a space object. The danger alarm device 102 is also provided with public condition information in which a public condition of the orbital information is set.

The danger analysis device 103 performs orbital analysis of the space object. For example, the danger analysis device 103 is an example of the collision analysis unit that analyzes collision of an unsteady-operation space object with an individual satellite constituting a mega-constellation satellite group. For example, the server 212 provided to the space traffic management device 100 of the mega-constellation business device 41 analyzes collision of the unsteady-operation space object with the individual satellite constituting the mega-constellation satellite group.

The danger avoidance action assist device 104 formulates role division of an avoidance action against a space object. For example, the danger avoidance action assist device 104 is an example of the countermeasure formulating unit that formulates a collision avoidance countermeasure when collision of a mega-constellation with an unsteady-operation space object is predicted. For example, the server 212 provided to the space traffic management device 100 of the mega-constellation business device 41 formulates a collision avoidance countermeasure when collision is predicted.

An avoidance action plan formulated by the danger avoidance action assist device 104 is set in the danger avoidance action implementation plan information 105.

The predicted orbital information and the performance orbital information may be set in the real-time high-accuracy orbital information to correspond to the satellite ID. The predicted orbital information and the performance orbital information are set in a real-time manner and accurately.

Unsteady orbital information may be set in the space information recorder 101 of the mega-constellation business device 41. Predicted orbital information about a space object which performs unsteady operation in an own mega-constellation is set in the unsteady orbital information. An epoch, orbital elements, and predicted errors are set in the predicted orbital information, just as in FIG. 11. In the present embodiment, predicted orbital information of a deorbiting satellite is set as an example of the unsteady orbital information.

<Debris Removal Business Device 45>

The space traffic management device 100 of the debris removal business device 45 is provided with a space information recorder 101, a danger alarm device 102, a danger analysis device 103 which performs orbital analysis of a space object, and a danger avoidance action implementation plan information 105.

Unsteady orbital information of a deorbiting satellite out of the first mega-constellation is set in the space information recorder 101.

Public orbital information 61 of the second mega-constellation satellite group is also set in the space information recorder 101. Further, real-time high-accuracy orbital information 64 of individual satellites constituting the second mega-constellation is set in the space information recorder 101.

The debris removal business device 45 removes debris with using a debris removal satellite. A configuration of the debris removal satellite is basically the same as that of the space object of FIG. 6, but is further provided with a capture device to capture capture-target debris. The debris removal satellite, in a state of holding captured debris, descends while performing active deorbit operation of actively avoiding collision based on control by the debris removal business device 45.

<Space Traffic Management Method (Debris Removal Method)>

Figure 20:
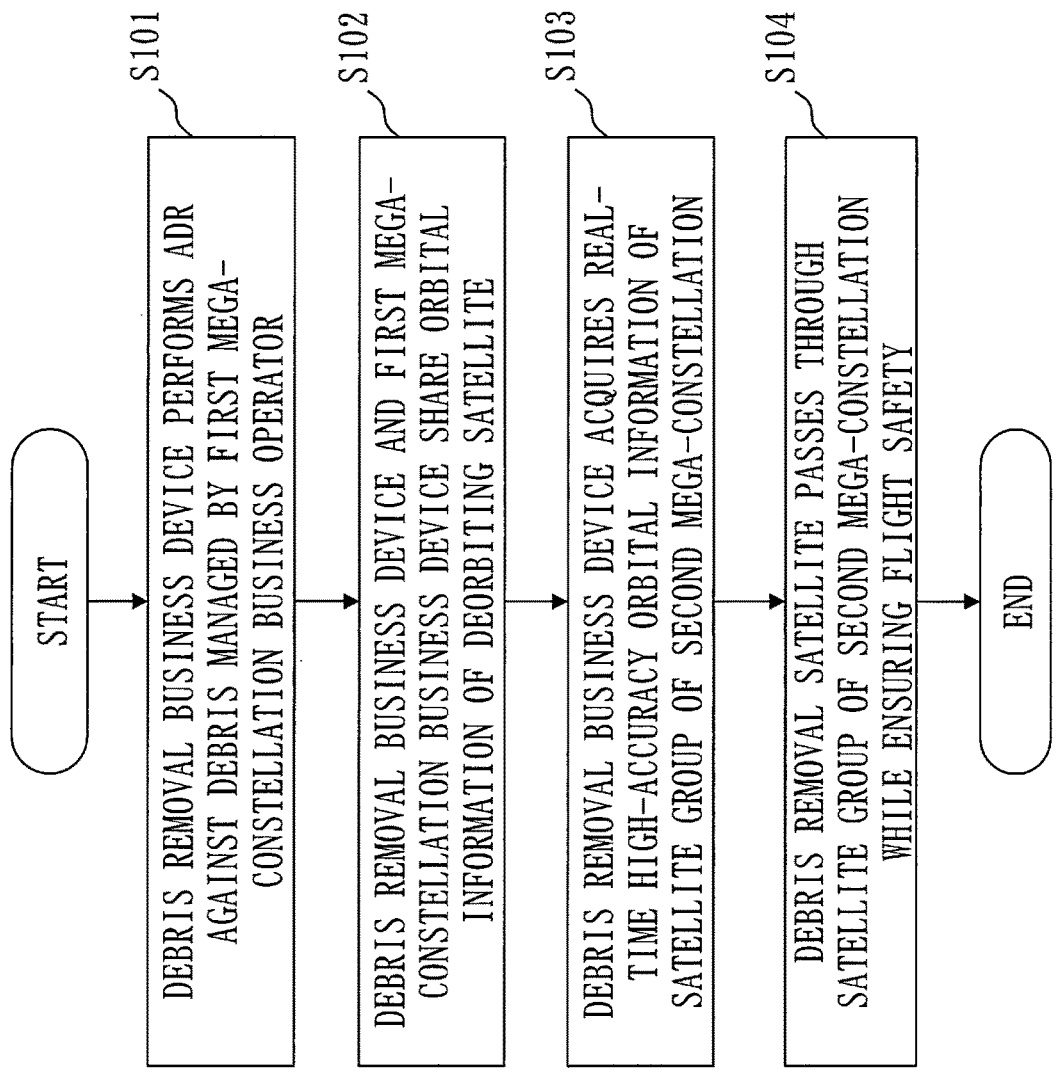
FIG. 20 is a flowchart of a space traffic management method by the space traffic management system according to Embodiment 1.

FIG. 20 is a flowchart of the space traffic management method by the space traffic management system 500 according to the present embodiment.

The space traffic management method (debris removal method) in the space traffic management system 500 according to the present embodiment will be described.

Example 1 of Space Traffic Management Method (Debris Removal Method)

The debris removal business device 45 performs ADR against debris formed by a satellite managed by the first mega-constellation business operator (step S101).

The debris removal business device 45 and the first mega-constellation business device 418 share orbital information of a deorbiting satellite (step S102).

The debris removal business device 45 acquires the real-time high-accuracy orbital information 64 of the second mega-constellation satellite group in a timeframe in which the debris removal satellite, during orbital descent, passes through an orbital altitude region where the second mega-constellation satellite group flies (step S103).

Then, a debris removal satellite passes through the second mega-constellation satellite group by control of the debris removal business device 45 while ensuring flight safety (step S104).

An overall configuration example (Example 1) of the space traffic management system 500 according to the present embodiment will be described with referring to FIG. 16.

Specifically, this is as follows.

(11) The debris removal business device 45 grasps information such as the orbital altitude region of the second mega-constellation satellite group in advance from the public orbital information 61 of the second mega-constellation business device 419.

(12) The debris removal business device 45 and the first mega-constellation business device 418 share orbital information of the deorbiting satellite after ADR by the first mega-constellation business device 418.

(13) The debris removal business device 45 issues a danger alarm against intrusion of the deorbiting satellite into the altitude orbital region of the second mega-constellation satellite group.

(14) The second mega-constellation business device 419 provides the real-time high-accuracy orbital information 64 of an individual satellite of the second mega-constellation in an intrusion timeframe, to the debris removal business device.

(15) The debris removal business device 45 performs collision analysis using the high-accuracy orbital information of the first mega-constellation and the second mega-constellation.

(16) The debris removal business device 45 formulates a collision avoidance action plan and releases it.

(17) The debris removal business device 45 puts a debris removal satellite into active deorbit operation to perform collision avoidance.

Example 2 of Space Traffic Management Method (Debris Removal Method)

The debris removal business device 45 performs ADR against debris formed by a satellite managed by the first mega-constellation business operator.

The debris removal business device 45 announces information of a timeframe in which the debris removal satellite, during orbital descent, passes through the orbital altitude region where the satellite group of the second mega-constellation business operator flies, and predicted orbital information of the debris removal satellite in that timeframe, to the second mega-constellation business operator.

The second mega-constellation business device utilized by the second mega-constellation business operator performs collision analysis and controls the satellite group of the second mega-constellation business operator, thereby avoiding collision.

Figure 21:
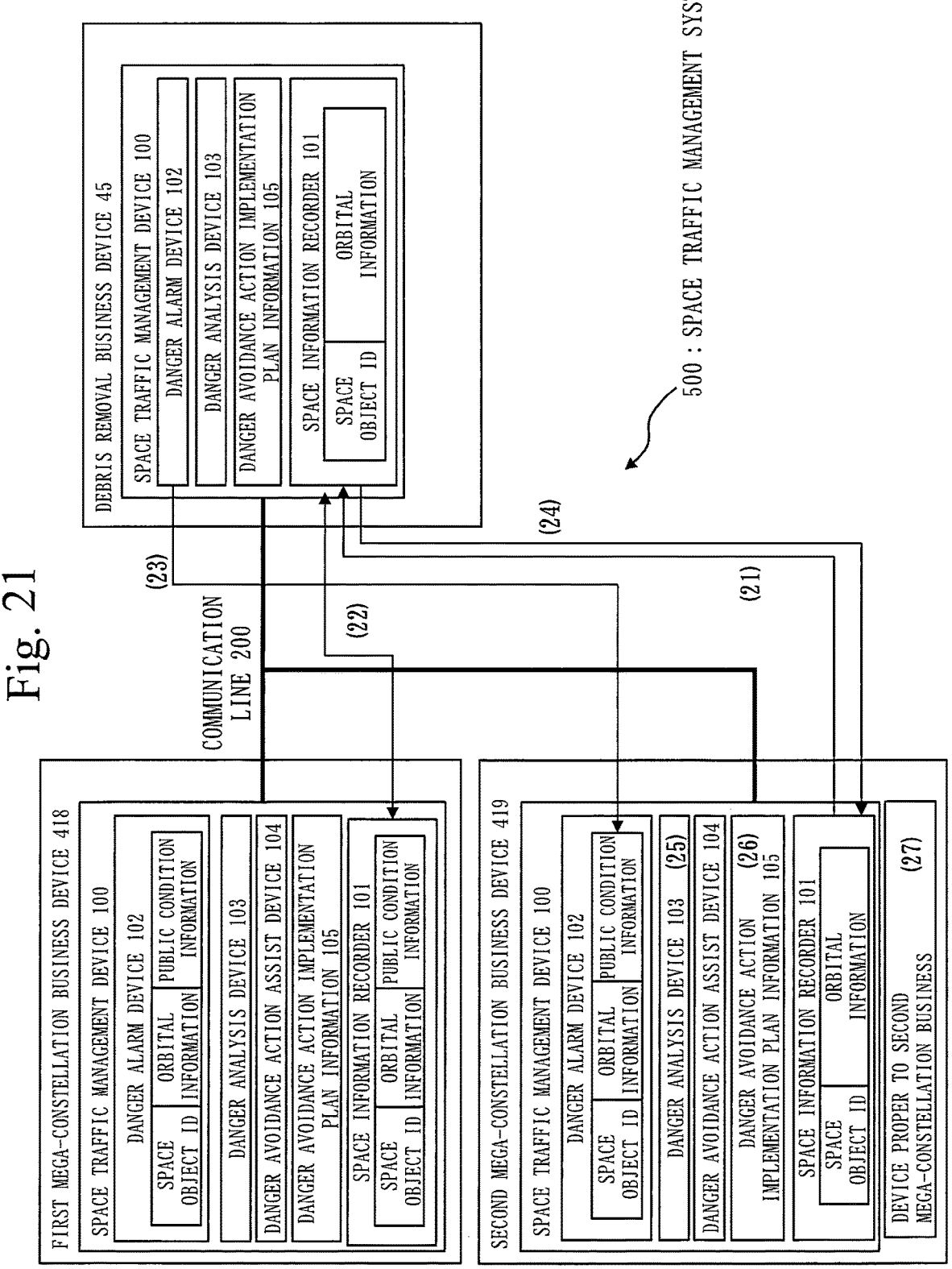
FIG. 21 presents an overall configuration example (Example 2) of the space traffic management system according to Embodiment 1.

FIG. 21 is a diagram illustrating an overall configuration example (Example 2) of the space traffic management system 500 according to the present embodiment.

Specifically, this is as follows.

(21) The debris removal business device 45 grasps information such as the orbital altitude region of the second mega-constellation satellite group in advance from the public orbital information 61 of the second mega-constellation business device 419.

(22) The debris removal business device 45 and the first mega-constellation business device 418 share orbital information of the deorbiting satellite after ADR by the first mega-constellation business device 418.

(23) The debris removal business device 45 issues a danger alarm against intrusion of the deorbiting satellite into the altitude orbital region of the second mega-constellation satellite group.

(24) The debris removal business device 45 provides the real-time high-accuracy orbital information 64 of an individual satellite of the first mega-constellation in an intrusion timeframe to the second mega-constellation business device 419. Particularly, real-time high-accuracy orbital information of the deorbiting satellite of the first mega-constellation in the intrusion timeframe is provided to the second mega-constellation business device 419.

(25) The second mega-constellation business device 419 performs collision analysis using the high-accuracy orbital information of the first mega-constellation and the second mega-constellation.

(26) The second mega-constellation business device 419 formulates a collision avoidance action plan and releases it.

(27) The second mega-constellation business device 419 performs collision avoidance.

Example 3 of Space Traffic Management Method
(Debris Removal Method)

The debris removal business device 45 performs ADR against debris formed by a satellite managed by the first mega-constellation business operator.

The first mega-constellation business device 418 utilized by the first mega-constellation business operator announces information of a timeframe in which the debris removal satellite, during orbital descent, passes through the orbital altitude region where the satellite group of the second mega-constellation business operator flies, and predicted orbital information of the debris removal satellite during this timeframe, to the second mega-constellation business device 419 utilized by the second mega-constellation business operator.

The second mega-constellation business device 419 performs collision analysis and controls the satellite group of the second mega-constellation business operator, thereby avoiding collision.

Figure 22:
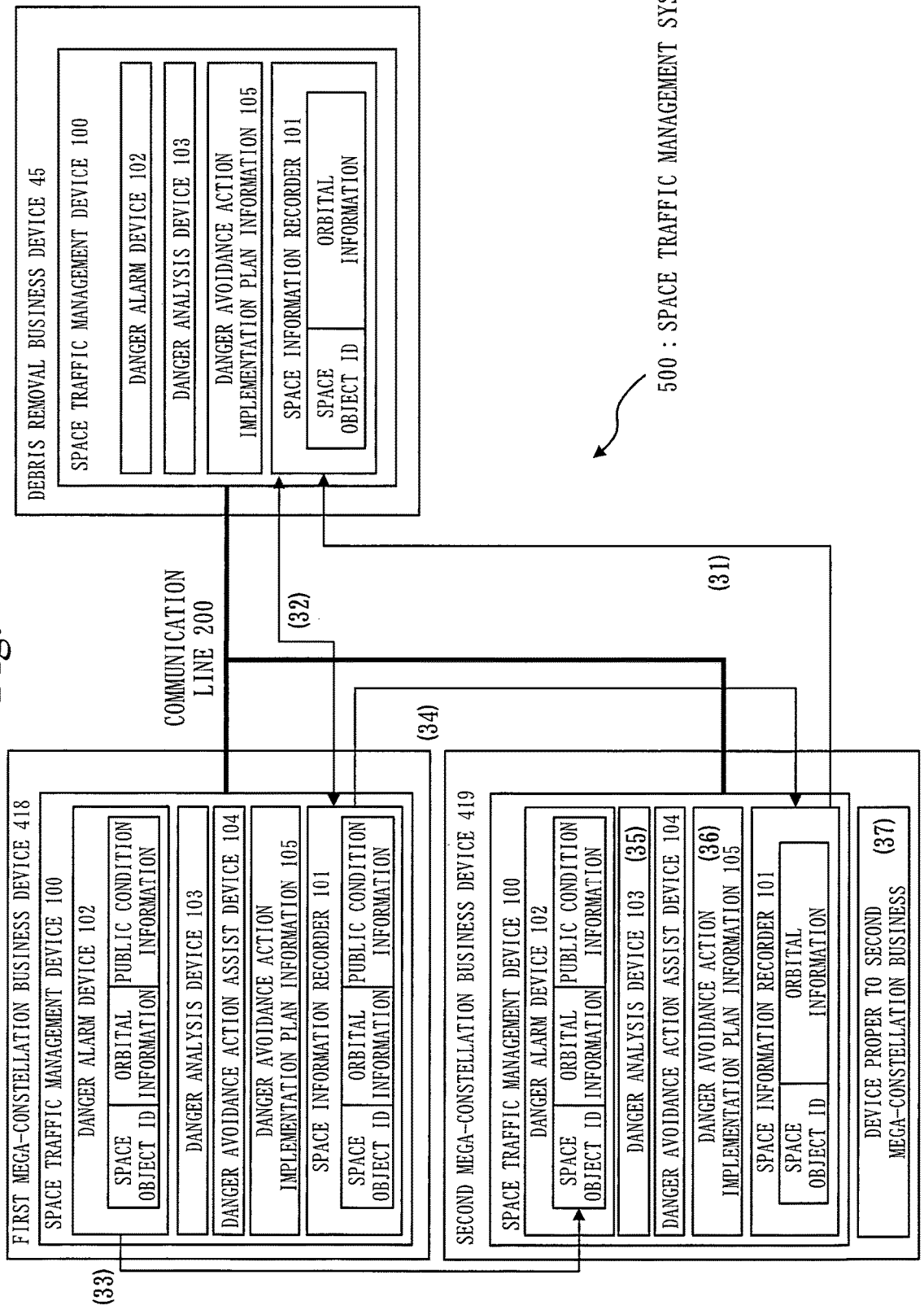
FIG. 22 presents an overall configuration example (Example 3) of the space traffic management system according to Embodiment 1.

FIG. 22 is a diagram illustrating an overall configuration example (Example 3) of the space traffic management system 500 according to the present embodiment.

Specifically, this is as follows.

(31) The debris removal business device 45 grasps information such as the orbital altitude region of the second mega-constellation satellite group in advance from the public orbital information 61 of the second mega-constellation business device 419.

(32) The debris removal business device 45 and the first mega-constellation business device 418 share orbital information of the deorbiting satellite after ADR by the first mega-constellation business device 418.

(33) The first mega-constellation business device 418 issues a danger alarm against intrusion of the deorbiting satellite into the altitude orbital region of the second mega-constellation satellite group.

(34) The first mega-constellation business device 418 provides the real-time high-accuracy orbital information of an individual satellite of the first mega-constellation in an intrusion timeframe, to the second mega-constellation business device 419. Particularly, real-time high-accuracy orbital information of the deorbiting satellite of the first mega-constellation in the intrusion timeframe is provided to the second mega-constellation business device 419.

(35) The second mega-constellation business device 419 performs collision analysis using the high-accuracy orbital information of the first mega-constellation and the second mega-constellation.

(36) The second mega-constellation business device 419 formulates a collision avoidance action plan and releases it.

(37) The second mega-constellation business device 419 performs collision avoidance.

In the present embodiment, business devices as follows have been described.

The debris removal business device 45 performs Active Debris Removal (ADR) against debris formed by the satellite managed by the first mega-constellation business operator. The debris removal business device 45 announces information of a timeframe in which the debris removal satellite, during orbital descent, passes through the orbital altitude region where the satellite group of the second mega-constellation business operator flies, and predicted orbital information of the debris removal satellite during this timeframe, to the second mega-constellation business operator.

The first mega-constellation business device 418 performs ADR against debris formed by the satellite managed by the first mega-constellation business operator. The first mega-constellation business device 418 announces information of a timeframe in which the debris removal satellite, during this timeframe, passes through the orbital altitude region where the satellite group of the second mega-constellation business operator flies, and predicted orbital information of the debris removal satellite, to the second mega-constellation business operator.

ADR is performed against debris formed by the satellite managed by the first mega-constellation business operator. Information of a timeframe in which the debris removal satellite, during orbital descent, passes through the orbital altitude region where the satellite group of the second mega-constellation business operator flies, and predicted orbital information of the debris removal satellite during this timeframe, are announced to the second mega-constellation business device 419.

The second mega-constellation business device 419 performs collision analysis and controls the satellite group of the second mega-constellation business operator, thereby avoiding collision.

\*\*\* Other Configurations \*\*\*

A modification of the present embodiment may be possible in which the space traffic management system performs the following debris removal method.

The first mega-constellation business device announces the following information to the second mega-constellation business device during orbital descent of an individual satellite that is to be subjected to PMD, out of the first mega-constellation satellite group, or during orbital descent of an individual satellite that is to be subjected to ADR by the debris removal business operator using the debris removal satellite. The first mega-constellation business device announces information of a timeframe in which the debris removal satellite passes through the orbital altitude region where the second mega-constellation satellite group flies, and predicted orbital information of the individual satellite or the debris removal satellite during that timeframe, to the second mega-constellation business device.

The first mega-constellation business device announces the following information to the second mega-constellation business device during orbital descent of an individual satellite that was subjected to PMD, out of the first mega-constellation satellite group, or during orbital descent of an individual satellite that was subjected to ADR by the debris removal business operator using the debris removal satellite.

The second mega-constellation business device acquires the information of a timeframe in which the debris removal satellite passes through the orbital altitude region where the second mega-constellation satellite group flies, and predicted orbital information of the individual satellite or the debris removal satellite during that timeframe, from the first mega-constellation business device, and performs both or one of collision analysis and collision avoidance.

* Other Configurations *

In the present embodiment, the functions of the space traffic management device 100 are implemented by software. A modification may be possible in which the functions of the space traffic management device 100 are implemented by hardware.

Figure 23:
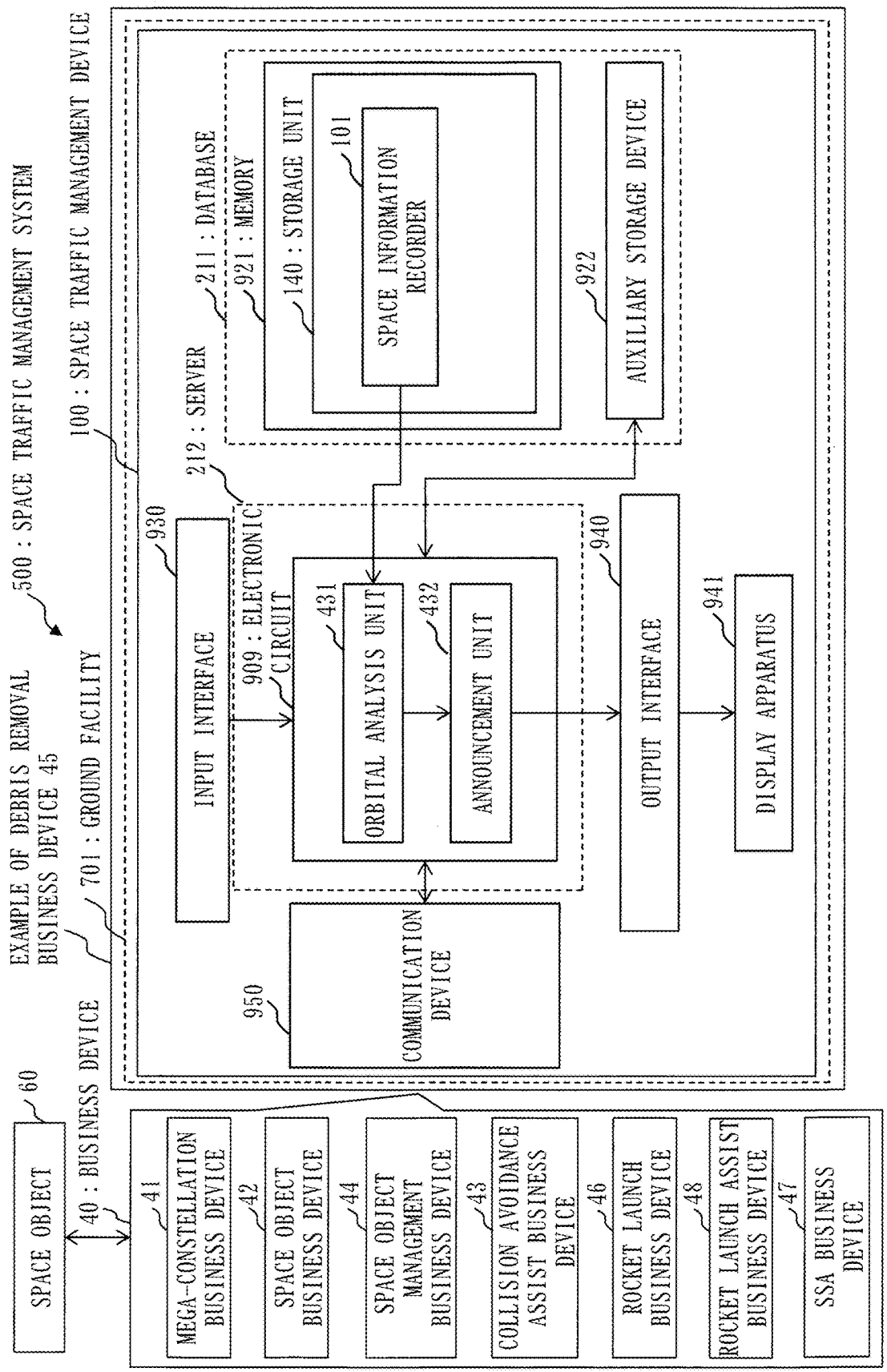
FIG. 23 is a diagram illustrating a configuration of a space traffic management device according to a modification of Embodiment 1.
Figure 24:
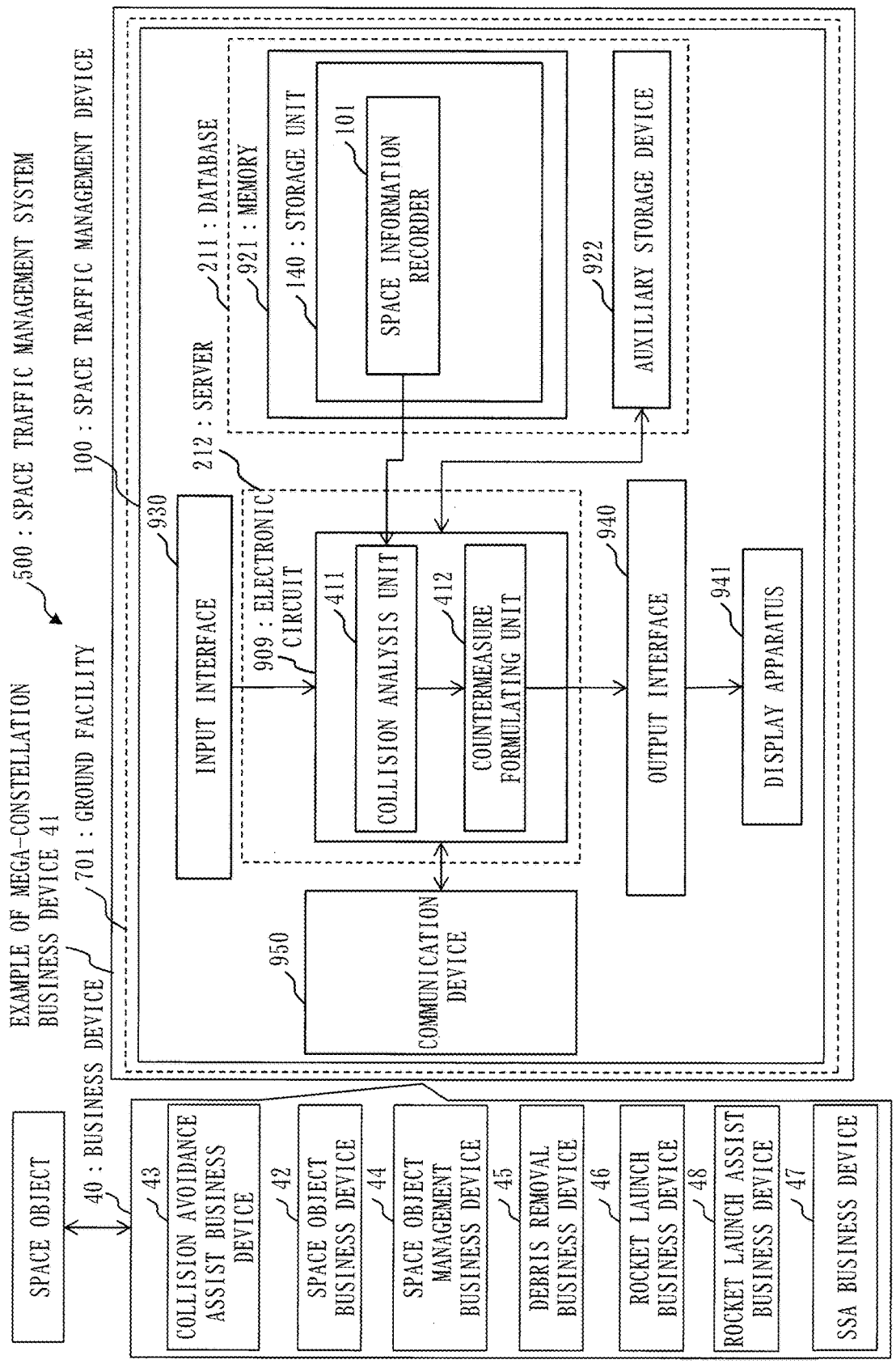
FIG. 24 is a diagram illustrating a configuration of a space traffic management device according to a modification of Embodiment 1.

FIGS. 23 and 24 are diagrams each illustrating a configuration of a space traffic management device 100 according to a modification of the present embodiment.

The space traffic management device 100 is provided with an electronic circuit 909 in place of a processor 910.

The electronic circuit 909 is a dedicated electronic circuit that implements the functions of the space traffic management device 100.

The electronic circuit 909 is specifically a single circuit, a composite circuit, a programmed processor, a parallel-programmed processor, a logic IC, a GA, an ASIC, or an FPGA. GA stands for Gate Array.

The functions of the space traffic management device 100 may be implemented by one electronic circuit, or may be distributed among a plurality of electronic circuits and implemented by them.

Another modification may be possible in which some of the functions of the space traffic management device 100 are implemented by an electronic circuit and the remaining functions are implemented by software.

A processor and an electronic circuit are called processing circuitry as well. That is, the functions of the space traffic management device 100 are implemented by processing circuitry.

Description of Effect of Present Embodiment

In Example 1 of the space traffic management system and the space traffic management method according to the present embodiment, the debris removal business operator acquires real-time high-accuracy orbital information of another business operator's mega-constellation satellite group for only a timeframe limitedly where the debris removal satellite passes through a flight orbital altitude region of another business operator's mega-constellation satellite group.

In Example 2 of the space traffic management system and the space traffic management method according to the present embodiment, the debris removal business operator issues a danger alarm so that the mega-constellation satellite group side can perform danger analysis and a collision avoidance action.

With the method according to which the debris removal business operator issues a danger alarm and the mega-constellation satellite group side performs danger analysis and a collision avoidance action, the debris removal business operator is an offender who makes a trouble, and the mega-constellation business operator through which the offender passes is a casualty who is troubled. In an event where a collision accident occurs, if the debris removal business operator is responsible for the accident, the feasibility of the debris removal business may be shaken. Therefore, with Example 3 of the space traffic management system and the space traffic management method according to the present embodiment, even if ADR itself is carried out by the debris removal business operator, the mega-constellation business operator who requests ADR gives a danger alarm to the intruding mega-constellation business operator B. Then, the business operator B can perform danger analysis and take collision avoidance action.

Many mega-constellation business operators are, so to speak, in the same boat. For each mega-constellation business operator, if another mega-constellation business operator exists both at a higher altitude than its own system and a lower altitude than its own system, a contradictory situation occurs which involves a risk that a high-altitude satellite in deorbiting might intrude into a lower-altitude flight region of another business operator, and a risk that a new satellite being put into orbit by rocket launch might intrude into a higher-altitude flight region of another business operator.

In the example of FIG. 12, for each of the mega-constellation business operators A, B, and C, a satellite group of another business operator exists at a higher altitude than its own satellite group, and a satellite group of another business operator exists at a lower altitude than its own satellite group.

Therefore, which is the offender and which is the casualty cannot be one-sidedly determined with respect to a responsibility for avoiding collision when an unsteady-operation space object intrudes into a steady operation orbit and with respect to an accountability for an accident when collision should occur. The positions of the business operator A, the business operator B, and the business operator C can be reversed anytime. Hence, without a framework where a plurality of mega-constellation business operators can coexist and prosper together, it is difficult to guarantee sustainability of mega-constellation businesses. Therefore, with Example 3 of the space traffic management system and the space traffic management method according to the present embodiment, since debris removal can be realized by a spirit of mutual help of those who are in the same boat, an effect of guaranteeing the continuity of the debris removal business is obtained.

Embodiment 2

In the present embodiment, a difference from Embodiment 1 and an additional point to Embodiment 1 will mainly be described.

In the present embodiment, a configuration having the same function as in Embodiment 1 will be denoted by the same reference sign, and its description will be omitted.

Due to emergence of mega-constellation business operators, currently, several thousand satellites fly at an orbital altitude of 500 km or less as if to exhaustively cover the sky. There is a risk that a debris removal business operator performs ADR from a high altitude of 1,000 km or more and a satellite in a process of deorbiting collides with a low-altitude mega-constellation. It is necessary to realize a framework in which danger analysis is carried out based on real-time high-accuracy orbital information held by only the mega-constellation business operators, thereby performing collision avoidance.

Studies have been in progress on building a public information system called Open Architecture Data Repository (OADR) which allows business operators to share orbital information of a space object so that flight safety of the space object is ensured.

The present embodiment will describe a mode of ensuring flight safety of a space object by the public information system called OADR.

When setting up an OADR as a public institution of international cooperation, there is a possibility that the OADR is authorized to make an instruction or request to a business operator beyond borders.

For example, in central management of orbital information of space objects possessed by business operators around the world, it is rational if the OADR can make an instruction or a request to provide orbital information under a rule based on an international consensus.

When a particular country sets up an OADR as a public institution, there is a possibility that the OADR is authorized to make an instruction or request to business operators of the relevant country.

There is also a possibility that the OADR forms a framework of disclosing information to business operators of the relevant country unconditionally while disclosing information conditionally to the other business operators.

As a public condition, it is possible to set entries such as fee charging, price setting, disclosure item restriction, accuracy restriction of public information, disclosure frequency restriction, and non-disclosure to a specific business operator.

For example, a difference of no charging or fee charging, or a difference in an amount of fee for information acquisition may arise between the relevant country and the other countries. How the public condition is set by the OADR will be influential from the viewpoint of framework making for space traffic management or industrial competitive power.

It is rational that, regarding space-object confidential information which serves security, the OADR being set up by a country as a public institution possesses the confidential information but keeps the confidential information closed to the outside. Therefore, there is a possibility that the OADR is provided with a database for storing non-public information, in addition to a database for information disclosure.

In addition, among pieces of space object information possessed by private business operators, there is information that cannot be disclosed to the public because, for example, the information belongs to a corporate secret. In addition, there is information that is not appropriate for public disclosure, because the information is under constant maneuver control and accordingly an amount of information or an update frequency of the information is enormous.

When performing danger analysis and analysis evaluation related to approach or collision of a space object, it is necessary that orbital information of all space objects be dealt with regardless of whether the space object is confidential or not. For this reason, when the OADR as a public institution performs danger analysis including confidential information and danger is predicted as a result of analysis evaluation, it is rational to restrict a publication target or a publication content and to perform conditional disclosure. For example, it is rational to restrict a publication target or a publication content and to perform conditional disclosure by processing information into disclosable information, and disclosing only orbital information of a risky timeframe to a disclosure target that contributes to danger avoidance.

In the future, when the number of on-orbit objects increases and the risk of approach or collision increases, various danger avoidance countermeasures will be needed, such as a means with which a debris removal business operator removes dangerous debris, and a means with which a mega-constellation business operator changes an orbital position or a passing timing so as to avoid collision. If the OADR, being a public institution, can instruct or request a business operator to execute a danger avoidance action, a very large effect can be expected in ensuring flight safety of space.

There are space objects managed by an institution, such as an emerging country venture business operator or a university, that is inexperienced in the space business and lacks information that serves danger avoidance. When it is predicted that a space object managed by such an institution which is inexperienced in the space business and lacks information that serves danger avoidance will intrude into an orbital altitude zone where a mega-constellation flies, the OADR intermediates to transmit the relevant information to the business operator in need of the information, so that the danger can be avoided quickly and effectively.

In addition, when implementation of a danger avoidance countermeasure, or space insurance, is mediated or introduced to private business operators, it will contribute to promotion and industrialization of space traffic management.

The OADR may be realized in the following modes.
A mode where the OADR is provided with only a public database.
A mode where the OADR possesses a danger analysis means, a collision avoidance assist means, or a space situational awareness (SSA) means to contribute to danger avoidance independently.
A mode where the OADR gives an instruction or a request to a business operator, or performs mediation or introduction to a business operator, thus contributing to danger avoidance through information management.

For realizing the OADR, there are various possibilities other than the above-mentioned modes.

"The OADR mediates implementation of a method" signifies a case where, for example, an entity implementing a method such as the debris removal method and the space traffic management method includes a plurality of external business devices other than the OADR, and the OADR does not issue a compulsory order but encourages implementation of the method by intermediating among the plurality of business devices. "The OADR mediates implementation of a debris removal method" is paraphrased as, for example, "the OADR intermediates so that a plurality of external business devices other than the OADR cooperate with each other to implement a debris removal method". Alternatively, "mediation" may be replaced with "teaching".

A configuration example of the OADR according the present embodiment will be described below.

Configuration Example 1 of OADR

Figure 25:
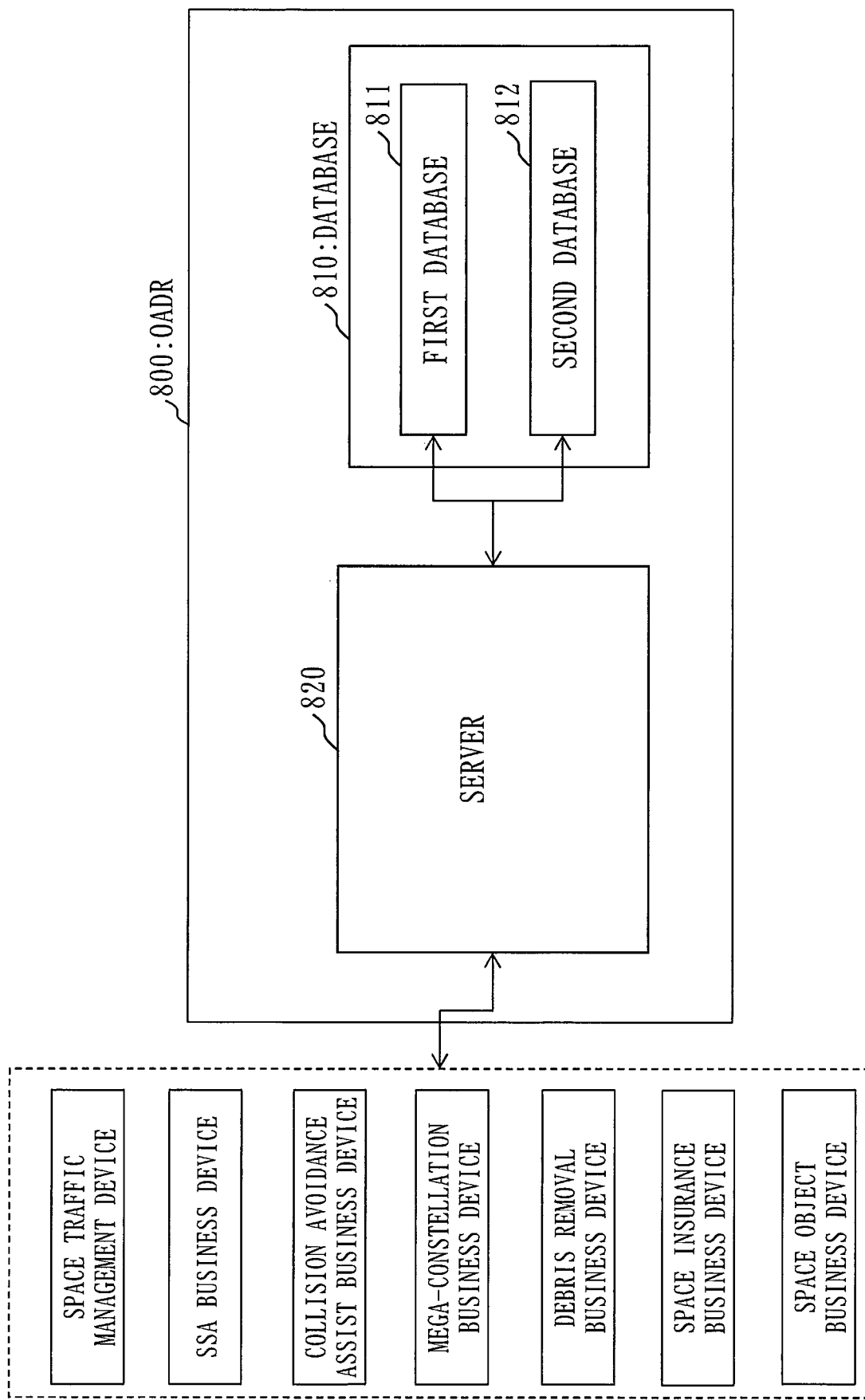
FIG. 25 is a diagram illustrating a function configuration example of an OADR according to Embodiment 2.

FIG. 25 illustrates an OADR 800 as Configuration Example 1 according to the present embodiment.

The OADR 800 is a public information system to disclose orbital information of a space object. The OADR 800 is provided with a database 810 to store the orbital information of the space object, and a server 820.

The database 810 is provided with a first database 811 to store public information and a second database 812 to store non-public information.

The server 820 acquires space object information including non-public information from all or some of business devices which are: a space traffic management device; a space situational awareness business device (SSA business device); a collision avoidance assist business device; a mega-constellation business device; and a debris removal business device, and stores the acquired space object information to the second database 812. The space traffic management device is provided to, for example, CSpOC.

Conventionally, the U.S. CSpOC is not provided with a bi-directional line, and announces a danger alarm uni-directionally. If CSpOC is provided with a space traffic management device, CSpOC can contribute to space traffic management by communication of the space traffic management device with the other business devices via a bi-directional communication line.

The server 820 generates conditional public information restricting a publication target and a publication content and stores the generated information to the first database 811.

Then, the server 820 transmits the conditional public information only to a particular business device among the SSA business device, the collision avoidance assist business device, the mega-constellation business device, the debris removal business device, and a space insurance business device which deals with a space insurance.

The OADR 800 of Configuration Example 1 mediates implementation of the debris removal method described in Embodiment 1 while implementing the above functions.

There is a possibility that space object confidential information possessed by CSpOC and serving safety security is disclosed only to the OADR. A risk of approach or collision, including the confidential information, must be analyzed and must be predicted.

After the information is processed into conditional disclosable information, the conditional public information which serves collision avoidance assist is shared only to a business device related to a collision risk. Hence, even a private business operator can take a collision avoidance action.

Among pieces of space object information possessed by the private business operators, regarding space object information that cannot be disclosed to the public, the OADR processes the information into conditional disclosable information likewise, so that collision avoidance or debris removal becomes possible.

In above Embodiments 1 and 2, individual units in each of the space traffic management system, the space traffic management device, and the business device are described as independent function blocks. However, the space traffic management system, the space traffic management device, and the business device need not have configurations as in the embodiments described above. The function blocks in each of the space traffic management system and the space traffic management device may have any configurations as far as they can implement the functions described in the above embodiments. Also, each of the space traffic management system, the space traffic management device, and the business device may form one device, or may form a system constituted of a plurality of devices.

A plurality of parts out of Embodiments 1 and 2 may be practiced as a combination. Alternatively, one part of these embodiments may be practiced. Also, these embodiments may be practiced as a whole or partly as any combination.

That is, in Embodiments 1 and 2, any parts out of Embodiments 1 and 2 can be combined arbitrarily, or an arbitrary constituent element can be modified. Also, in Embodiments 1 and 2, an arbitrary constituent element can be omitted.

The embodiments described above are essentially preferable exemplifications and are not intended to limit the scope of the present disclosure, the scope of an application product of the present disclosure, and the scope of use of the present disclosure. Various changes can be made to the embodiments described above as necessary.

REFERENCE SIGNS LIST

20: satellite constellation; 21: orbital plane; 211: database; 212: server; 30: satellite; 31: satellite control device; 32: satellite communication device; 33: propulsion device; 34: attitude control device; 35: power supply device; 40: business device; 301: mega-constellation satellite group; 41: mega-constellation business device; 411: collision analysis unit; 412: countermeasure formulating unit; 431: orbital analysis unit; 432: announcement unit; 42: space object business device; 43: collision avoidance assist business device; 44: space object management business device; 45: debris removal business device; 46: rocket launch business device; 47: SSA business device; 48: rocket launch assist business device; 418: first mega-constellation business device; 419: second mega-constellation business device; 51: orbit prediction information; 52: satellite orbit prediction information; 53: debris orbit prediction information; 511: space object ID; 512: predicted epoch; 513: predicted orbital element; 514: predicted error; 60: space object; 70: Earth; 100: space traffic management device; 140: storage unit; 55: orbit control command; 61: public orbital information; 64: real-time high-accuracy orbital information; 500: space traffic management system; 600: satellite constellation forming system; 11, 11*b*: satellite constellation forming unit; 300: satellite group; 700, 701: ground facility; 510: orbit control command generation unit; 520: analytical prediction unit; 909: electronic circuit; 910: processor; 921: memory; 922: auxiliary storage device; 930: input interface; 940: output interface; 941: display apparatus; 950: communication device; 101: space information recorder; 102: danger alarm device; 103: danger analysis device; 104: danger avoidance action assist device; 105: danger avoidance action implementation plan information; 200: communication line; 800: OADR; 810: database; 811: first database; 812: second database; 820: server.

The invention claimed is:

1. A space traffic management system comprising:
a plurality of space traffic management devices each individually mounted in a different one of a plurality of mega-constellation business devices and in a debris removal business device, the plurality of space traffic management devices being connected to each other via a communication line and individually being mounted in a different one of a plurality of ground facilities, the plurality of mega-constellation business devices managing mega-constellations which are satellite constellations each consisting of 100 or more satellites, the debris removal business device removing debris in outer space, the space traffic management devices each comprising a database and a server,
wherein the debris removal business device
performs ADR (Active Debris Removal) against debris formed by a satellite managed by a first mega-constellation business operator, and acquires real-time high-accuracy orbital information of a satellite group of a second mega-constellation business operator in a timeframe in which a debris removal satellite, during orbital descent, passes through an orbital altitude region where the satellite group of the second mega-constellation flies, the debris removal satellite passing through the satellite group while ensuring flight safety.

2. The space traffic management system according to claim 1, wherein
a first mega-constellation business device in the plurality of mega-constellation business devices is used by the first mega-constellation business operator to request the debris removal business device to perform the ADR; and a second mega-constellation business device in the plurality of mega-constellation business devices manages the second mega-constellation through which the debris removal satellite flies during the orbital descent.

3. A space traffic management system comprising:

a plurality of space traffic management devices each individually mounted in a different one of a plurality of mega-constellation business devices and in a debris removal business device, the plurality of space traffic management devices being connected to each other via a communication line and individually being mounted in a different one of a plurality of ground facilities, the plurality of mega-constellation business devices managing mega-constellations which are satellite constellations each consisting of 100 or more satellites, the debris removal business device removing debris in outer space, the space traffic management devices each comprising a database and a server, wherein the debris removal business device performs ADR (Active Debris Removal) against debris formed by a satellite managed by a first mega-constellation business operator, and announces information of a timeframe in which a debris removal satellite, during orbital descent, passes through an orbital altitude region where a satellite group of a second mega-constellation business operator flies, and predicted orbital information of the debris removal satellite in that timeframe, to the second mega-constellation business operator, and wherein a second mega-constellation business device utilized by the second mega-constellation business operator performs collision analysis and controls the satellite group of the second mega-constellation business operator, thereby avoiding collision.

4. A space traffic management system comprising:

a plurality of space traffic management devices each individually mounted in a different one of a plurality of mega-constellation business devices and in a debris removal business device, the plurality of space traffic management devices being connected to each other via a communication line and individually being mounted in a different one of a plurality of ground facilities, the plurality of mega-constellation business devices managing mega-constellations which are satellite constellations each consisting of 100 or more satellites, the debris removal business device removing debris in outer space, the space traffic management devices each comprising a database and a server, wherein the debris removal business device performs ADR (Active Debris Removal) against debris formed by a satellite managed by a first mega-constellation business operator, wherein a first mega-constellation business device utilized by a first mega-constellation business operator announces information of a timeframe in which a debris removal satellite, during orbital descent, passes through an orbital altitude region where a satellite group of a second mega-constellation business operator flies, and predicted orbital information of the debris removal satellite during this timeframe, to a second mega-constellation business device utilized by the second mega-constellation business operator, and wherein the second mega-constellation business device performs collision analysis and controls the satellite group of the second mega-constellation business operator, thereby avoiding collision.

5. A debris removal method of a space traffic management system that includes a plurality of space traffic management devices each individually mounted in a different one of a plurality of mega-constellation business devices and in a debris removal business device, the plurality of space traffic management devices being connected to each other via a communication line and individually being mounted in a different one of a plurality of ground facilities, the plurality of mega-constellation business devices managing mega-constellations which are satellite constellations each consisting of 100 or more satellites, the debris removal business device removing debris in outer space, the space traffic management devices each comprising a database and a server, the method comprising:

performing, by the debris removal business device, ADR (Active Debris Removal) against debris formed by a satellite managed by a first mega-constellation business operator; and acquiring, by the debris removal business device, real-time high-accuracy orbital information of a satellite group of a second mega-constellation business operator in a timeframe in which a debris removal satellite, during orbital descent, passes through an orbital altitude region where the satellite group of the second mega-constellation flies, the debris removal satellite passing through the satellite group while ensuring flight safety.

6. An OADR (Open Architecture Data Repository) which mediates implementation of the debris removal method according to claim 4, wherein the OADR includes a database to store orbital information of a space object, and a server, and discloses the orbital information of the space object, wherein the database comprises a first database to store public information and a second database to store non-public information, and wherein the server acquires space object information including non-public information from all or some of business devices which are: a space traffic management device to manage space traffic; a space situational awareness business device to monitor a space situation; a collision avoidance assist business device to assist avoidance of collision of a space object in outer space; a mega-constellation business device to run a mega-constellation; and a debris removal business device to assist debris removal, and stores the acquired space object information to the second database, generates conditional public information restricting a publication target and a publication content and stores the generated information to the first database, and transmits the conditional public information only to a particular business device among the space situational business device, the collision avoidance assist business device, the mega-constellation business device, the debris removal business device, and a space insurance business device to deal with a space insurance.

7. A debris removal method of a space traffic management system that includes a plurality of space traffic management devices each individually mounted in a different one of a plurality of mega-constellation business devices and in a debris removal business device, the plurality of space traffic management devices being connected to each other via a communication line and individually being mounted in a different one of a plurality of ground facilities, the plurality of mega-constellation business devices managing mega-constellations which are satellite constellations each consisting of 100 or more satellites, the debris removal business device removing debris in outer space, the space traffic management devices each comprising a database and a server, the method comprising:

performing, by the debris removal device, ADR (Active Debris Removal) against debris formed by a satellite managed by a first mega-constellation business operator; and announcing, by the debris removal device, information of a timeframe in which a debris removal satellite, during orbital descent, passes through an orbital altitude region where a satellite group of a second mega-constellation business operator flies, and predicted orbital information of the debris removal satellite in that timeframe, to the second mega-constellation business operator, and wherein a second mega-constellation business device utilized by the second mega-constellation business operator performs collision analysis and controls the satellite group of the second mega-constellation business operator, thereby avoiding collision.

8. An OADR (Open Architecture Data Repository) which mediates implementation of the debris removal method according to claim 5, wherein the OADR includes a database to store orbital information of a space object, and a server, and discloses the orbital information of the space object, wherein the database comprises a first database to store public information and a second database to store non-public information, and wherein the server acquires space object information including non-public information from all or some of business devices which are: a space traffic management device to manage space traffic; a space situational awareness business device to monitor a space situation; a collision avoidance assist business device to assist avoidance of collision of a space object in outer space; a mega-constellation business device to run a mega-constellation; and a debris removal business device to assist debris removal, and stores the acquired space object information to the second database, generates conditional public information restricting a publication target and a publication content and stores the generated information to the first database, and transmits the conditional public information only to a particular business device among the space situational business device, the collision avoidance assist business device, the mega-constellation business device, the debris removal business device, and a space insurance business device to deal with a space insurance.

9. A debris removal method of a space traffic management system that includes a plurality of space traffic management devices each individually mounted in a different one of a plurality of mega-constellation business devices and in a debris removal business device, the plurality of space traffic management devices being connected to each other via a communication line and individually being mounted in a different one of a plurality of ground facilities, the plurality of mega-constellation business devices managing mega-constellations which are satellite constellations each consisting of 100 or more satellites, the debris removal business device removing debris in outer space, the space traffic management devices each comprising a database and a server, the method comprising:

performing, by the debris removal business device, ADR (Active Debris Removal) against debris formed by a satellite managed by a first mega-constellation business operator, wherein a first mega-constellation business device utilized by a first mega-constellation business operator announces information of a timeframe in which a debris removal satellite, during orbital descent, passes through an orbital altitude region where a satellite group of a second mega-constellation business operator flies, and predicted orbital information of the debris removal satellite during this timeframe, to a second mega-constellation business device utilized by the second mega-constellation business operator, and wherein the second mega-constellation business device performs collision analysis and controls the satellite group of the second mega-constellation business operator, thereby avoiding collision.

10. An OADR (Open Architecture Data Repository) which mediates implementation of the debris removal method according to claim 6, wherein the OADR includes a database to store orbital information of a space object, and a server, and discloses the orbital information of the space object, wherein the database comprises a first database to store public information and a second database to store non-public information, and wherein the server acquires space object information including non-public information from all or some of business devices which are: a space traffic management device to manage space traffic; a space situational awareness business device to monitor a space situation; a collision avoidance assist business device to assist avoidance of collision of a space object in outer space; a mega-constellation business device to run a mega-constellation; and a debris removal business device to assist debris removal, and stores the acquired space object information to the second database, generates conditional public information restricting a publication target and a publication content and stores the generated information to the first database, and transmits the conditional public information only to a particular business device among the space situational business device, the collision avoidance assist business device, the mega-constellation business device, the debris removal business device, and a space insurance business device to deal with a space insurance.

11. A second mega-constellation business device of a space traffic management system that includes a plurality of space traffic management devices each individually mounted in a first mega-constellation business device, the second mega-constellation business device, and a debris removal business device, the first mega-constellation business device, the second mega-constellation business device, and the debris removal business device being connected to each other via a communication line and individually being mounted in a different one of a plurality of ground facilities, the first mega-constellation business device and the second mega-constellation business device managing mega-constellations which are satellite constellations each consisting of 100 or more satellites, the debris removal business device removing debris in outer space, the space traffic management devices each comprising a database and a server, wherein the second mega-constellation business device performs ADR (Active Debris Removal) against debris formed by a satellite managed by the first mega-constellation business operator, and announces information of a timeframe in which a debris removal satellite, during orbital descent, passes through an orbital altitude region where a satellite group of the second mega-constellation business operator flies, and predicted orbital information of the debris removal satellite in that timeframe, to the second mega-constellation business operator, and wherein the second mega-constellation business device utilized by the second mega-constellation business operator performs collision analysis and controls the satellite group of the second mega-constellation business operator, thereby avoiding collision.

12. A mega-constellation business device of a space traffic management system that includes a plurality of space traffic management devices each individually mounted in a different one of a plurality of mega-constellation business devices that include the mega-constellation business device and in a debris removal business device, the plurality of space traffic management devices being connected to each other via a communication line and individually being mounted in a different one of a plurality of ground facilities, the plurality of mega-constellation business devices managing mega-constellations which are satellite constellations each consisting of 100 or more satellites, the debris removal business device removing debris in outer space, the space traffic management devices each comprising a database and a server, wherein, during orbital descent of an individual satellite that was subjected to PMD (Post Mission Disposal)), out of a first mega-constellation satellite group of a first mega-constellation business operator, or during orbital descent of an individual satellite that was subjected to ADR (Active Debris Removal) by a debris removal business operator using a debris removal satellite, a second mega-constellation business device acquires information of a timeframe in which the debris removal satellite passes through an orbital altitude region where a second mega-constellation satellite group of a second mega-constellation business operator flies, and predicted orbital information of the individual satellite or the debris removal satellite during that timeframe, from a first mega-constellation business device, and performs both or one of collision analysis and collision avoidance.

* * * * *